(12) United States Patent
Mansell

(10) Patent No.: US 11,669,958 B2
(45) Date of Patent: *Jun. 6, 2023

(54) SYSTEM AND METHOD FOR CORRECTING PAVING MAT DEFECTS

(71) Applicant: Caterpillar Paving Products Inc., Brooklyn Park, MN (US)

(72) Inventor: Todd Mansell, Rogers, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,651

(22) Filed: Aug. 16, 2021

(65) Prior Publication Data
US 2022/0005175 A1 Jan. 6, 2022

Related U.S. Application Data

(63) Continuation of application No. 16/827,466, filed on Mar. 23, 2020, now Pat. No. 11,127,135.

(51) Int. Cl.
*G06T 7/00* (2017.01)
*H04L 67/125* (2022.01)
*E01C 19/00* (2006.01)

(52) U.S. Cl.
CPC ............ *G06T 7/001* (2013.01); *E01C 19/004* (2013.01); *G06T 7/0008* (2013.01); *H04L 67/125* (2013.01); *G06T 2207/30132* (2013.01)

(58) Field of Classification Search
CPC . G06T 2207/30256; G06T 2207/30244; G06T 7/13; G06T 7/174; G06T 7/60; G06T 2207/20081; G06T 7/73; G06T 2207/30132; G06T 7/0004; G06T 7/11; G06T 2207/30181; G06T 7/001; G06T 2207/20092; G06T 2207/20021; G06K 9/00791; G06K 9/00805; G06K 9/52; G06K 2209/27; G06K 9/00798; G06K 9/00818; G06K 9/00825; G06K 9/4604; G06K 9/0063; G06K 9/00664; G06K 9/342

See application file for complete search history.

(56) References Cited

U.S. PATENT DOCUMENTS

| | | | |
|---|---|---|---|
| 6,615,648 B1 | 9/2003 | Ferguson et al. | |
| 10,482,330 B2 | 11/2019 | Buschmann et al. | |
| 10,789,660 B1 | 9/2020 | Schmidt | |
| 11,127,135 B1 * | 9/2021 | Mansell | ........... E01C 19/48 |

(Continued)

FOREIGN PATENT DOCUMENTS

| | | |
|---|---|---|
| JP | 2018178549 A | 11/2018 |
| JP | 6473844 B1 | 2/2019 |
| KR | 20110032065 A | 3/2011 |

*Primary Examiner* — Quan M Hua
(74) *Attorney, Agent, or Firm* — Lee & Hayes, P.C.

(57) ABSTRACT

A method includes receiving sensor data indicative of a paved surface, and identifying a defect associated with the paved surface based at least in part on the sensor data. The method also includes determining that the defect is of a defect type based on determining that a value associated with the defect is within a value range associated with the defect type. The method further includes generating a command associated with the defect that, when executed by a machine, at least partially remedies the defect. The method also includes providing the command to an electronic device via a network.

20 Claims, 13 Drawing Sheets

(56) References Cited

U.S. PATENT DOCUMENTS

| | | | |
|---|---|---|---|
| 2003/0069668 A1* | 4/2003 | Zurn | E01C 23/07 |
| | | | 700/245 |
| 2012/0218411 A1 | 8/2012 | Wu et al. | |
| 2016/0292518 A1* | 10/2016 | Banitt | G06T 7/0004 |
| 2017/0045448 A1* | 2/2017 | Lin | G01N 21/95692 |
| 2018/0068495 A1* | 3/2018 | Chainer | G07C 5/008 |

* cited by examiner

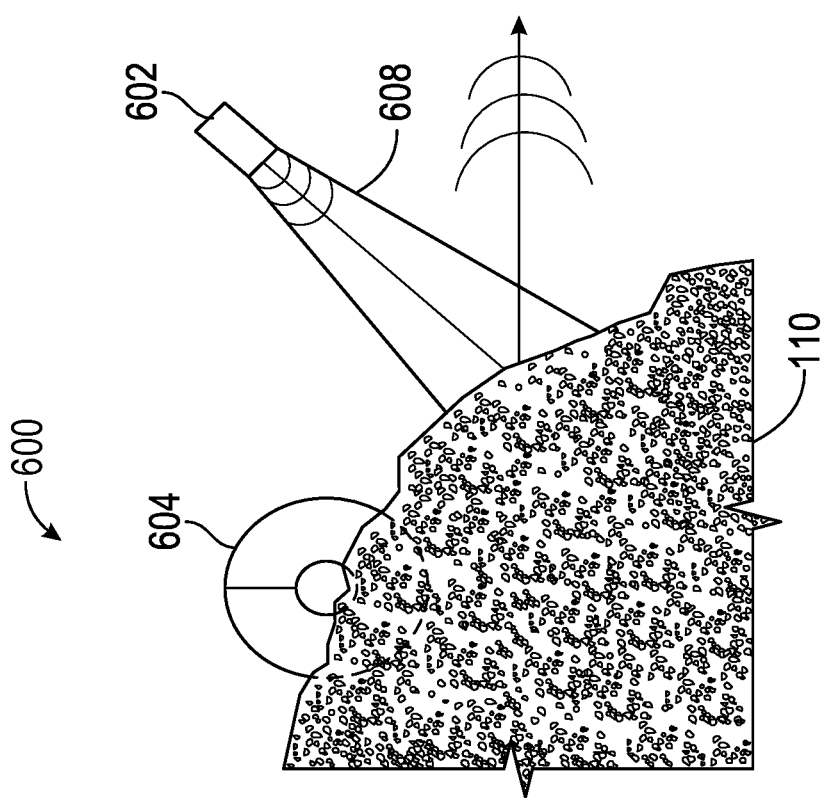
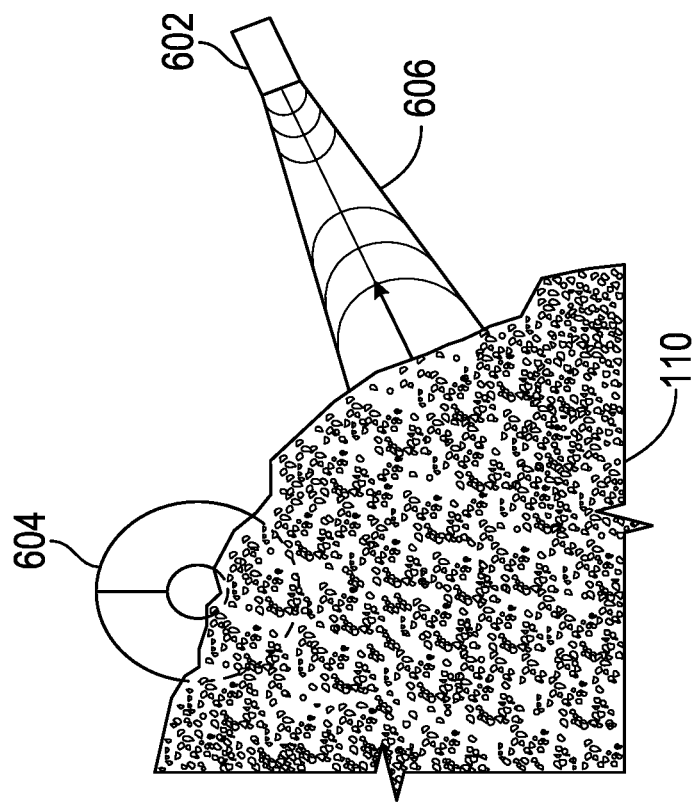
FIG. 6

SYSTEM AND METHOD FOR CORRECTING PAVING MAT DEFECTS

CROSS-REFERENCE TO RELATED APPLICATION

This patent application is a continuation of and claims priority to U.S. patent application Ser. No. 16/827,466, filed Mar. 23, 2020, which is fully incorporated herein by reference.

TECHNICAL FIELD

The present disclosure relates to a control system for a paving machine. More specifically, the present disclosure relates to a control system configured to identify paving mat defects and generate instructions to correct the identified paving mat defects.

BACKGROUND

A paving machine, such as an asphalt paver, is a self-propelled construction machine designed to receive, convey, distribute, profile, and partially compact paving material. Such a paving machine accepts heated paving material (e.g., asphalt) into a receiving hopper at the front of the paving machine. The heated asphalt material in the hopper is conveyed to the rear of the paving machine by conveyors positioned at a base of the hopper. The asphalt material is then distributed across a width of the paving machine by means of two opposing screws or augers. Finally, a screed assembly located at the rear of the paving machine profiles and compacts the asphalt material into an asphalt surface, referred to as a "mat".

A paving machine has numerous parts that can interact with one another and the surroundings of the paving machine, and is subject to various settings based on the type of paving material being applied and characteristics of the environment. If a part of the paving machine is malfunctioning, an error is present in a computing system of the paving machine, or a setting of the paving machine is incorrect or unsuitable for current conditions, to name a few examples, the resulting mat may have one or more defects. Defects of the mat (paved surface) may require that the mat be repaired, or in some cases, that the mat is removed and replaced entirely, costing valuable time and resources. Although most operations in the paving process rely heavily on the training, skill, and experience of paving machine operators, often times the paving machine operator or other personnel do not have sufficient experience to identify every possible defect that arises in the mat, and/or how to resolve and mitigate defects once identified.

An example system for determining road surface defects is described in U.S. Patent Application No. 2012/0218441 (hereinafter referred to as the '441 reference). In particular, the system described in the '441 reference is configured to analyze infrared thermal images of the road surface, and to diagnose defects present on the road. The '441 reference further describes various preventive maintenance solutions. However, the system described in the '441 reference requires an analyst to judge all images that depict defects one by one to give conclusions of treatment and/or a proposed treatment solution. The accuracy of such conclusions depends upon the experience and training of the individual analyst, and these conclusions are prone to human error. Additionally, the conclusions provided by the analyst described in the '441 reference are dependent upon the analyst being available at the time a paving defect is identified, which in a paving scenario, may cause delay based on analyst bandwidth and/or scheduling. Such delays reduce the overall efficiency of the system and/or the paving operation.

Example embodiments of the present disclosure are directed toward overcoming the deficiencies described above.

SUMMARY

In an aspect of the present disclosure, an example method includes receiving, with a controller, image data indicative of a paved surface and identifying, with the controller and based at least in part on the image data, a defect associated with the paved surface, the defect having a characteristic that is characterized by a value. Such an example method also includes determining, with the controller, that the value is within a value range corresponding to a defect type, and determining, based at least in part on the value being within the value range, that the defect is of the defect type. Such an example method further includes generating a command associated with the defect and based at least in part on determining that the defect is of the defect type. In such methods, the command identifies a proposed machine activity which, when executed by a machine on the paved surface, at least partially remedies the defect. Such an example method further includes providing the command to an electronic device via a network.

In another aspect of the present disclosure, a system includes a sensing device and a system controller in communication with a controller of the sensing device. The system controller is configured to receive, from the sensing device, sensor data indicative of a paved surface, and identify, based at least in part on the sensor data, a defect associated with the paved surface, the defect having a characteristic that is characterized by a value. The controller is also configured to determine that the value is within a value range corresponding to a defect type, and determine, based at least in part on the value being within the value range, that the defect is of the defect type. The controller is further configured to generate a command associated with the defect and based at least in part on determining that the defect is of the defect type, wherein the command identifies a proposed machine activity which, when executed by a machine on the paved surface, at least partially remedies the defect. The controller is further configured to provide the command to an electronic device and via a network.

In yet another aspect of the present disclosure, an example method includes receiving, with a controller and from a sensing device located at a worksite via a network, sensor data indicative of a paved surface at the worksite, and identifying, based at least in part on the sensor data, a defect associated with the paved surface, where the defect has a characteristic that is characterized by a value. Such an example method further includes determining, with the controller, that the value is within a value range corresponding to a defect type. Such an example method further includes determining, with the controller, and based at least in part on the value being within the value range, that the defect is of the defect type. Such an example method further includes generating, with the controller, a command associated with the defect and based at least in part on determining that the defect is of the defect type, where the command identifies a proposed machine activity which, when executed by a paving machine on the paved surface, at least partially remedies the defect. Such an example method further includes providing the command with the controller to the paving machine via the network, where the command causes the paving machine to change a setting of a component of the paving machine associated with the proposed machine activity.

BRIEF DESCRIPTION OF DRAWINGS

FIG. 6 is a schematic illustration of a sensor included on a paving machine that determines a distance to paving material, in accordance with an example of the present disclosure.

DETAILED DESCRIPTION

Figure 1:
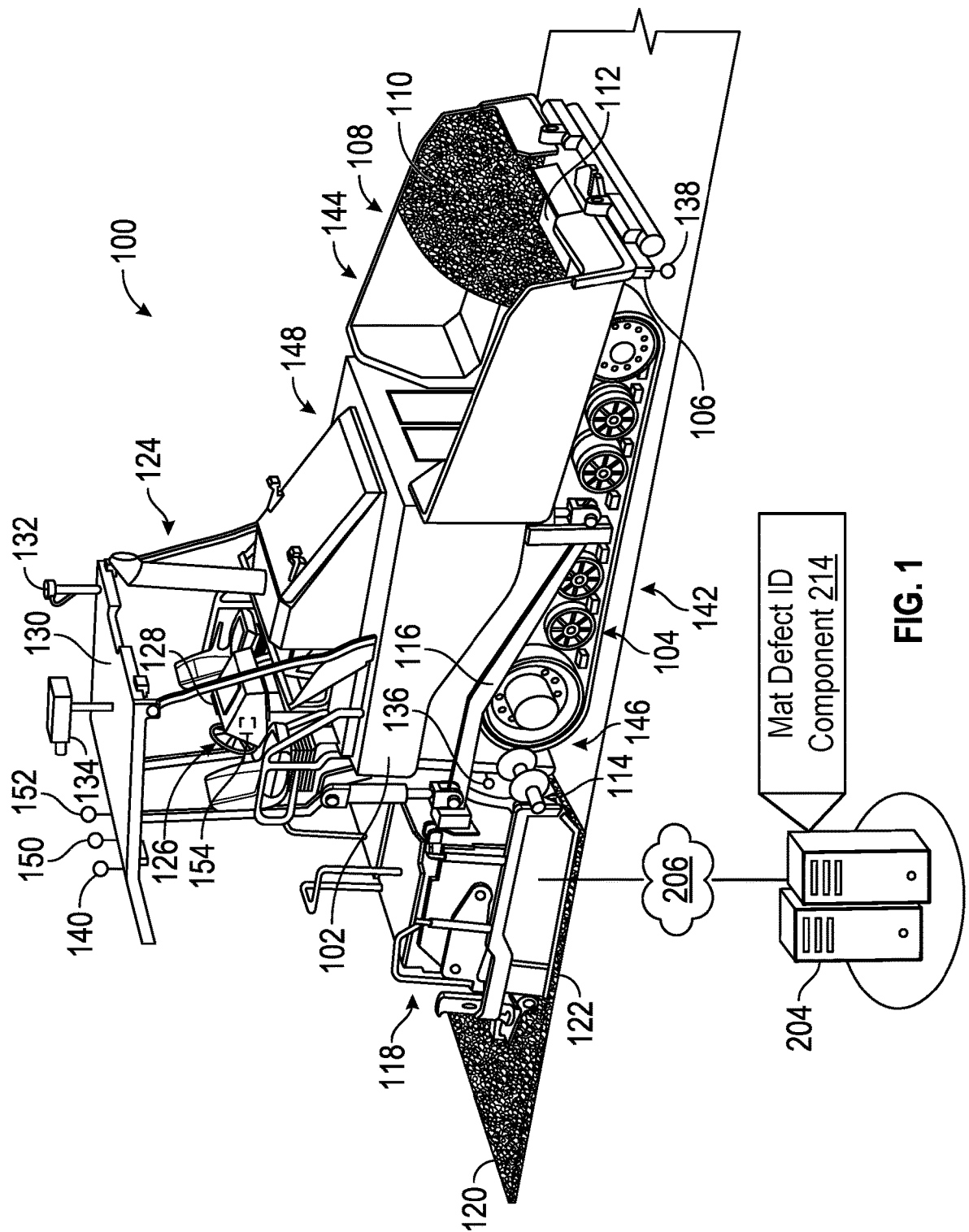
FIG. 1 is a perspective view of a paving machine that includes a machine controller in communication with a mat defect identification component in accordance with an example of the present disclosure.

Wherever possible, the same reference numbers will be used throughout the drawings to refer to the same or like parts. FIG. 1 shows a paving machine 100 which is used, for example, to deposit asphalt, concrete, or other materials on a work surface associated with a worksite. As shown in FIG. 1, the paving machine 100 is in communication with one or more computing devices 204 via a network 206. The one or more computing devices 204 include a mat defect ID component 214 configured to identify defects in a paving mat and generate commands that, when executed by the paving machine 100, a crew member at a worksite with the paving machine 100, a haul truck delivering paving material 110 to the paving machine 100, and so forth, at least partially remedy the defect. While the following detailed description describes examples in connection with the paving machine 100, it should be appreciated that the description applies equally to the use of the present disclosure in other machines as well.

The paving machine 100 includes a tractor portion 102 supported on a set of ground-engaging elements 104. The tractor portion 102 includes a tractor frame 106, as well as a power source for driving the ground-engaging elements 104. Although the ground engaging elements 104 are illustrated as continuous tracks, it should be contemplated that the ground engaging elements 104 may be any other type of ground engaging elements as well, for example, wheels etc. In some cases the power source is a conventional internal combustion engine operating on fossil or hybrid fuels, or in examples is an electrically operated drive powered by alternate energy sources. The paving machine 100 includes a hopper 108 for storing a paving material 110. The paving machine 100 also includes a conveyor system 112 for conveying the paving material 110 from the hopper 108 to other downstream components of the paving machine 100. For example, the paving machine 100 includes an auger assembly 114 which receives the paving material 110 supplied via the conveyor system 112, and distributes the paving material 110 on the paving surface 122. In some examples, the auger assembly 114 includes at least one main auger. In some cases, the auger assembly 114 includes a main auger, and an auger extension coupled to the main auger via an auger bearing or other coupling component. Additionally, in some examples, the auger assembly 114 includes a main auger and an additional auger disposed opposite the main auger. In such examples, the main auger and the additional auger is configured to distribute the paving material 110 across substantially an entire width of the paving machine 100. The paving machine 100 further includes a tow arm 116 which couples a height adjustable screed portion 118 to the tractor portion 102 so as to spread and compact the paving material 110 into a mat 120 on the paving surface 122. The tow arm 116 is actuated by a hydraulic actuator, an electric actuator (not shown), and/or any other type of actuator as per application requirements. In examples, any of the ground-engaging elements 104, the hopper 108, the conveyor system 112, the auger assembly 114, the tow arm 116, and/or the screed portion 118 can receive commands from the mat defect ID component 214 to adjust settings such as speed, height, and the like to remedy defects detected in the mat 120.

Further referring to FIG. 1, an operator station 124 is coupled to the tractor portion 102. The operator station 124 includes a console 126 and other levers or controls (not shown) for operating the paving machine 100. For example, the console 126 includes a control interface 128 for controlling various functions of the paving machine 100. The control interface 128 may comprise an analog, digital, and/or touchscreen display, and such a control interface 128 is configured to display, for example, commands that when executed by the paving machine 100, remedy defects of mat 120 according to the present disclosure. The control interface 128 also supports other allied functions, including for example, sharing various operating data with one or more other machines (not shown) operating in consonance with the paving machine 100.

As shown, the operator station 124 includes a roof 130. A communication device 132 and/or a camera 134 (or other image capture device) are coupled to the roof 130 as illustrated in FIG. 1. Alternatively, in some examples, at least one of the communication device 132 and/or the camera 134 are coupled to other portions of the paving machine 100. The communication device 132 is capable of determining a location of the paving machine 100, and includes and/or comprises a component of a global positioning system (GPS). For example, the communication device 132 comprises a GPS receiver, transmitter, transceiver, and/or other such device, and the communication device 132 is in communication with one or more GPS satellites (not shown) to determine a location of the paving machine 100 continuously, substantially continuously, or at various time intervals. Alternatively or additionally, the communication device 132 is in communication with a ground-based location station, virtual reference station (VRS), global navigation satellite system, or other survey coordinate system to determine the location of the paving machine 100. In examples, the communication device 132 also enables the paving machine 100 to communicate with the one or more other machines, and/or with one or more remote servers, processors, or control systems located remote from the worksite at which the paving machine 100 is being used, such as the computing devices 204 that include the mat defect ID component 214. In some examples, the camera 134 is a digital camera configured to record and/or transmit digital images and/or video of the mat 120, paving surface 122, and/or worksite in real-time. In some cases, the camera 134 comprises an infrared sensor, a thermal camera, or other like device configured to record and/or transmit thermal images of the mat 120, paving surface 122, and/or worksite in real-time. In examples, the camera 134 provides image data to the mat defect ID component 214 via the network 206 (e.g., by way of the controller 154), which the mat defect ID component 214 uses to identify defects of the mat 120 based on the image data.

As shown in FIG. 1, the paving machine 100 also includes one or more temperature sensors 136, 138, 140. One or more such temperature sensors 136, 138, 140 may comprise a mechanical, electrical, electro-mechanical, electronic, infrared, or any other type of a temperature sensor known in the art. In some examples, one or more such temperature sensors 136, 138, 140 include an air purge device or other such device (not shown) to prevent debris from forming on the temperature sensor. Such an example air purge device receives purge air from an air source storing pressurized air to prevent any dirt, debris etc. which may stick to the temperature sensor.

In some examples, the temperature sensor 136 comprises a first temperature sensor connected to the paving machine 100 proximate the auger assembly 114, and the temperature sensor 136 is configured to sense, measure, detect, and/or otherwise determine temperatures of the paving material 110 at the auger assembly 114. As shown in FIG. 1, the paving machine 100 includes a first side 142 (e.g., a right-hand side) and a second side 144 (e.g., a left-hand side) opposite the first side 142. Likewise, in such examples the auger assembly 114 includes a first portion 146 disposed on the first side 142 of the paving machine 100, and a second portion 148 (labeled in FIG. 1 but obstructed from view) disposed on the second side 144 of the paving machine 100. In such examples, the first portion 146 of the auger assembly 114 includes a first main auger extending laterally from proximate a center of the auger assembly 114. The first portion 146 of the auger assembly 114 also includes a first auger extension connected to the first main auger via a first auger bearing or other coupling component. Further, in such examples the second portion 148 of the auger assembly 114 includes a second main auger, opposite the first main auger, extending laterally from proximate the center of the auger assembly 114. The second portion 148 of the auger assembly 114 also includes a second auger extension connected to the second main auger via a second auger bearing or other coupling component. In such examples, the first main auger is substantially coaxially aligned with the second main auger to assist in evenly depositing the paving material 110 on the paving surface 122 and/or across substantially an entire width of the paving machine 100.

In examples, the temperature sensor 136 is positioned proximate the first portion 146 of the auger assembly 114, and is configured to determine the temperature of the paving material 110 at the first portion 146 of the auger assembly 114. Further, at least one additional temperature sensor (not shown) is positioned proximate the second portion 148 of the auger assembly 114 on the second side 144 of the paving machine 100. In such examples, the at least one additional temperature sensor is configured to determine the temperature of the paving material 110 at the second portion 148 of the auger assembly 114. In such examples, the temperature sensor 136 is positioned and/or otherwise configured to determine the temperature of the paving material 110 at and/or proximate the first auger bearing described above, or at other locations associated with the first portion 146 of the auger assembly 114. Similarly, in such examples the at least one additional temperature sensor described above is positioned and/or otherwise configured to determine the temperature of the paving material 110 at and/or proximate the second auger bearing described above, or at other locations associated with the second portion 148 of the auger assembly 114. For example, the temperature sensor 136 and/or the additional temperature sensor comprises infrared sensors configured to sense, measure, and/or detect infrared radiation emitted by the paving material 110 as the paving material 110 passes the first and second auger bearings, and/or just before the paving material 110 is processed by the screed portion 118. The temperature sensor 136 generates a signal including information indicative of the temperature of the paving material 110 at the first portion 146 of the auger assembly 114. Likewise, the additional temperature sensor described above generates a signal including information indicative of the temperature of the paving material 110 at the second portion 148 of the auger assembly 114. In some examples, the temperature sensor 136 provides the signal (e.g., by way of the controller 154) including information indicative of the temperature of the paving material 110 to the mat defect ID component 214, which uses information included in the signal to identify defects of the mat 120.

With continued reference to FIG. 1, the temperature sensor 138 is positioned on the tractor frame 106, the hopper 108, and/or at any other location on the paving machine 100 convenient for determining a temperature of the paving surface 122. For example, the temperature sensor 138 is positioned on the tractor frame 106 proximate the ground engaging elements 104, and/or at any other location convenient for determining a ground temperature. The temperature sensor 138 is configured to generate a signal including information indicative of the ground temperature. Additionally, the temperature sensor 140 is positioned on the roof 130, the tractor portion 102, and/or at any other location on the paving machine 100 convenient for determining an ambient temperature at the worksite. The temperature sensor 140 is also configured to determine an ambient pressure and/or other parameters at the worksite. In such examples, the temperature sensor 140 generates a signal including information indicative of ambient conditions such as ambient temperature, pressure, etc. The temperature sensor 138 and/or the temperature sensor 140 provide the respective signals (e.g., by way of the controller 154) including information indicative of the temperatures of the paving surface 122 or the ambient temperature of the worksite to the mat defect ID component 214, which uses information included in the signal(s) to identify defects of the mat 120 and/or to generate commands as described in more detail below.

In some examples, the paving machine 100 includes a LIDAR sensor 150 and/or a RADAR sensor 152. While depicted on the roof 130, the LIDAR sensor 150 and/or the RADAR sensor 152 may be positioned at any location on the paving machine 100, or another location proximate the paving machine 100 at which the sensors capture sensor data of the mat 120. Additionally, while one LIDAR sensor 150 and one RADAR sensor 152 are shown, any number of LIDAR sensors and/or RADAR sensors may be incorporated into and/or proximate the paving machine 100. In examples, the LIDAR sensor 150 measures distance to a target (e.g., the mat 120) by illuminating the target with laser light and measuring the reflected light with a sensor. The LIDAR sensor 150 uses differences in laser return times and wavelengths to make digital 3D representations of the target. For instance, the LIDAR sensor 150 generates a signal including information indicative of a 3D representation of the target. Additionally, in some examples, the RADAR sensor 152 uses radio waves to determine the range, angle, or velocity of a target (e.g., the mat 120). The RADAR sensor 152 generates a signal that includes information such as range, angle, and/or velocity of the target. It should be contemplated that the paving machine 100 may include various other sensors to measure various other parameters related to the paving machine 100, the mat 120, and/or the worksite. The LIDAR sensor 150 and/or the RADAR sensor 152 provide the respective signals (e.g., by way of the controller 154) including information indicative of the environment of the worksite to the mat defect ID component 214, which uses information included in the signal(s) to identify defects of the mat 120 and/or to generate commands as described in more detail below.

The paving machine 100 also includes a controller 154 in communication with the control interface 128, the communication device 132, the camera 134, the temperature sensors 136, 138, 140, the LIDAR sensor 150, the RADAR sensor 152 and/or other components of the paving machine 100. The controller 154 may be a single controller or multiple controllers working together to perform a variety of tasks. In examples, the controller 154 embodies a single or multiple microprocessors, field programmable gate arrays (FPGAs), digital signal processors (DSPs), and/or other components configured to identify, calculate, and/or otherwise determine defects of the mat 120 based on one or more signals received from the camera 134, the temperature sensors 136, 138, 140, the LIDAR sensor 150, and/or the RADAR sensor 152. Numerous commercially available microprocessors can be configured to perform the functions of the controller 154.

Various known circuits may be associated with the controller 154, including power supply circuitry, signal-conditioning circuitry, actuator driver circuitry (i.e., circuitry powering solenoids, motors, or piezo actuators), and communication circuitry. In some examples, the controller 154 is positioned on the paving machine 100, while in other examples the controller 154 is positioned at an off-board location and/or remote location relative to the paving machine 100. The present disclosure, in any manner, is not restricted to the type of controller 154 or the positioning of the controller 154 relative to the paving machine 100.

Figure 2:
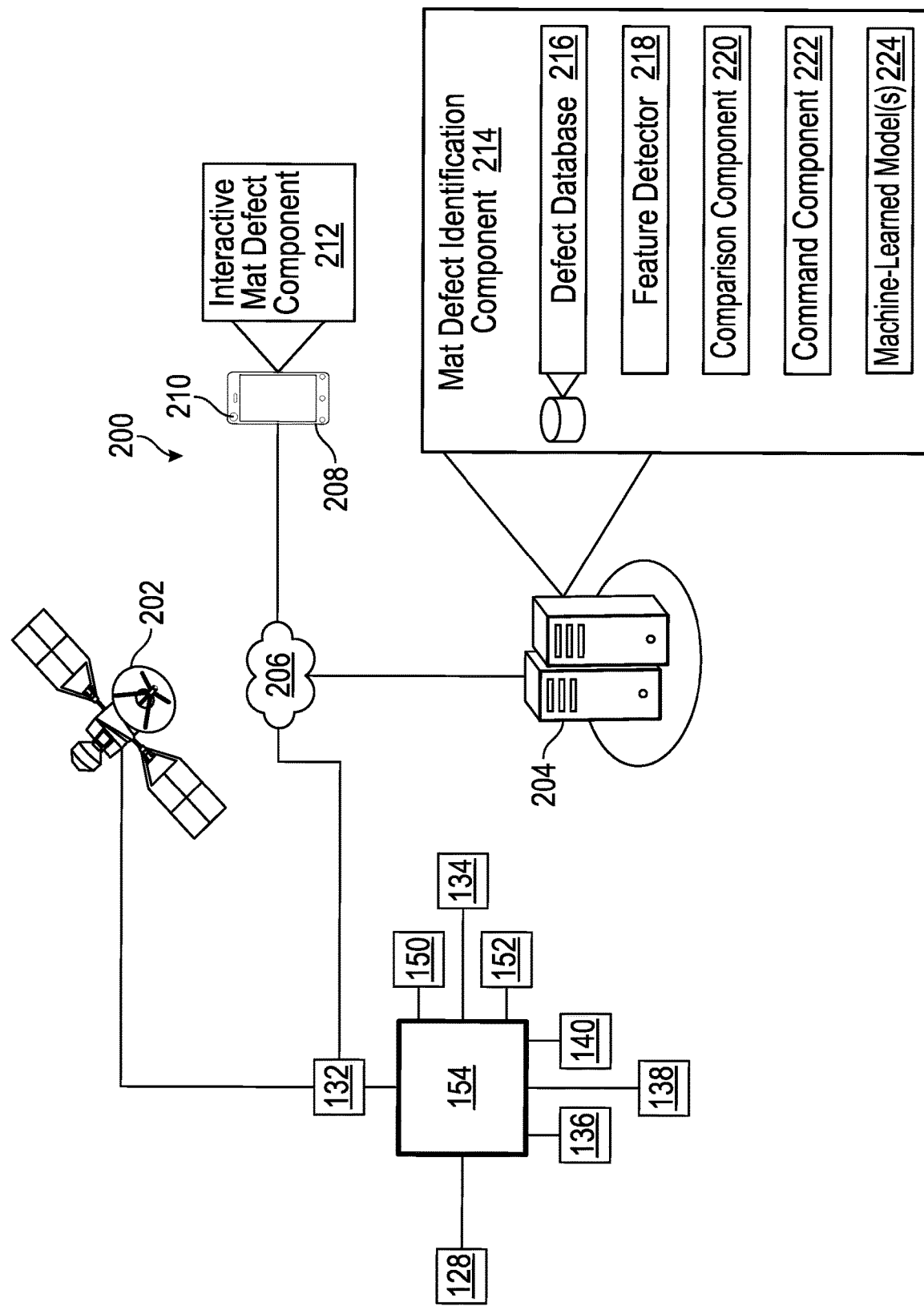
FIG. 2 is a block diagram schematically representing a control system associated with the paving machine in accordance with an example of the present disclosure.

FIG. 2 is a block diagram schematically representing a control system 200 associated with the paving machine 100 in accordance with an example of the present disclosure. In any of the examples described herein, the control system 200 includes at least one of the controller 154, the control interface 128, the communication device 132, the camera 134, the temperature sensor 136, the additional temperature sensor (not shown) described above with respect to the second portion 148 of the auger assembly 114, the temperature sensor 138, the temperature sensor 140, the LIDAR sensor 150, the RADAR sensor 152, and/or any other sensors or components of the paving machine 100. In such examples, the controller 154 is configured to receive respective signals from such components. For example, the controller 154 receives one or more signals from the communication device 132 including information indicating a location of the paving machine 100. As shown in FIG. 2, the communication device 132 is connected to and/or otherwise in communication with one or more satellites 202 or other GPS components configured to assist the communication device 132 in determining the location of the paving machine 100. In some examples, such satellites 202 or other GPS components comprise components of the control system 200. The controller 154, the control interface 128, the communication device 132, the camera 134, the temperature sensor 136, the additional temperature sensor (not shown) described above with respect to the second portion 148 of the auger assembly 114, the temperature sensor 138, the temperature sensor 140, the LIDAR sensor 150, the RADAR sensor 152, and/or any other sensors or components of the paving machine 100 provide information usable to determine defects in the mat 120 and generate commands to provide to the paving machine 100 to at least partially remedy the defects.

As shown in FIG. 2, the control system 200 may also include one or more additional components. For example, the control system 200 includes one or more remote servers, processors, or other such computing devices 204. Such computing devices 204 may comprise, for example, one or more servers, laptop computers, or other computers located at a paving material plant remote from the worksite at which the paving machine 100 is being used. In such examples, the communication device 132 is connected to and/or otherwise in communication with such computing devices 204 via a network 206. The network 206 may be a local area network ("LAN"), a larger network such as a wide area network ("WAN"), or a collection of networks, such as the Internet. Protocols for network communication, such as TCP/IP, may be used to implement the network 206. Although embodiments are described herein as using a network such as the Internet, other distribution techniques may be implemented that transmit information via memory cards, flash memory, or other portable memory devices. The control system 200 may further include one or more electronic devices such as tablets, mobile phones, laptop computers, and/or other mobile devices 208. Such mobile devices 208 may be located at the worksite or, alternatively, one or more such mobile devices 208 may be located at the paving material plant described above, or at another location remote from the worksite. In such examples, the communication device 132 is connected to and/or otherwise in communication with such mobile devices 208 via the network 206. In any of the examples described herein, the sensor data, location information, paving material maps, and/or any other information received, processed, or generated by the controller 154 is provided to the computing devices 204 and/or the mobile devices 208 via the network 206.

In some examples, the controller 154 receives signals from one or more of the camera 134, the temperature sensor 136, the additional temperature sensor described above with respect to the second portion 148 of the auger assembly 114, the temperature sensor 138, the temperature sensor 140, the LIDAR sensor 150, and/or the RADAR sensor 152. For instance, the controller 154 receives sensor data such as images, video, LIDAR data, RADAR data, infrared data, and/or other sensor data associated with the mat 120. Alternatively or additionally, the mobile device 208 includes a camera 210 (and/or any of the other sensors described herein) that generates sensor data, such as sensor data associated with the mat 120. For instance, a crew member operating the paving machine 100 may suspect that the mat 120 includes a defect, and capture an image of the suspected defect in the mat 120 using the camera 210 of the mobile device 208. In some examples, the crew member utilizes an interactive mat defect component 212 of the mobile device 208 to communicate the image to the computing device 204 via the network 206. The interactive mat defect component 212 is, in some cases, an application installed on the mobile device 208 that enables a user, such as the crew member just described, to submit sensor data associated with suspected mat defects, compare the sensor data to sensor data known to be associated with a particular defect, receive commands on how to control the paving machine 100 to remedy the defect, and so forth as described herein.

The controller 154 and/or the interactive mat defect component 212 of the mobile device 208 provides sensor data to a mat defect identification (ID) component 214. The mat defect ID component 214 is configured to identify mat defects from sensor data, and map the mat defect to one or more commands that will at least partially remedy the mat defect. For example, the mat defect ID component 214 includes a defect database 216 that includes images or other sensor data types that are known to illustrate mat defects and the defect types of the mat defects. The defect database 216, in some cases, includes sensor data illustrating different defects in different weather conditions, at different times of day, at different ambient temperatures, having different paving material properties, and so forth. Additionally, in examples, the defect database 216 includes maps to commands associated with defects that at least partially remedy the respective defects. In some cases, multiple different commands are mapped to a single defect, where the multiple different commands may be applied together to remedy the defect (e.g., increase the grade reference and tighten the screed plates), and/or may be applied sequentially to remedy the defect (e.g., increase the grade reference, and if the defect is not remedied, tighten the screed plates).

In the control system 200, the mat defect ID component 214 includes a feature detector 218 configured to compute abstractions of image (or other sensor) information and make local decisions at image points in the image regarding whether the image point includes an image feature or not. For instance, the feature detector 218 is configured to detect edges, corners, ridges, blobs, or other image feature types. An edge can be characterized by a gradient magnitude of image brightness that is greater than a threshold between pixels of an image, where the pixels may or may not be proximate one another. A corner is characterized similarly to an edge, but is further analyzed to determine rapid changes in direction of the edge, and thus has a two-dimensional structure. A ridge corresponds to an elongated feature in an image represented by capturing the major axis of symmetry of the feature, while an edge typically relates to a boundary of an object. Blobs provide information on a region of interest in an image by implementing image structures, which in some cases may provide more accuracy than corners, that are more point-like. For instance, a detected blob may include areas in an image that are too smooth to be detected by a corner detector. In some examples, the mat defect ID component 214 selects a region of interest of an image (e.g., corresponding to the mat 120) on which the feature detector 218 is to perform feature detection. However, in some cases, the feature detector 218 detects features in an image prior to the location of the mat defect ID component 214 determining the region of interest. Other feature detectors are also considered.

In some examples, the mat defect ID component 214 uses the features identified by the feature detector 218 to locate, within an image, a location of a potential mat defect of the mat 120. In an illustrative example, the mat defect ID component 214 detects an edge in an image where a difference in extender height from a height of the screed portion 118 of the paving machine 100 has caused the mat 120 to be different thicknesses. A relatively straight line may be represented in the image that defines a boundary between the first mat thickness created by the screed portion 118 and the second mat thickness created by the extender of the paving machine 100. The feature detector 218 detects such a line as, for example, an edge, and the mat defect ID component 214 uses the location of the detected edge in the image to compare the suspected defect to known defects stored in the defect database 216.

For instance, the mat defect ID component 214 includes a comparison component 220 that is configured to compare a potential mat defect in sensor data (such as an image) to known defects in the defect database 216. In examples, the comparison component 220 determines a value associated with the detected feature in the sensor data, and compares the value to known values (and/or value ranges) associated the known defects in the defect database 216. In cases where image data is used, the comparison component 220 determines whether a size of a first defect in image data received from the camera 134 and/or the camera 210 is within a threshold size of a second defect known to be of the defect type indicated in second image data stored in the defect database 216. The comparison component 220 relies on one or more of a variety of characteristics of defects and their associated values to determine the presence of a mat defect from sensor data. For example, characteristics of the defects described herein include differences of material structure from an ideal mat 120, such as bumps, cracks, crevices, segregation of aggregate material, and so forth. Additionally, values characterizing such example characteristics include size values (e.g., length, width, height, depth, and the like of the suspected defect), temperature values, distance values and/or angle values (e.g., relative to the paving machine 100 or a particular part of the paving machine 100, relative to an extent of the mat 120, and the like), and so on. In some examples, the defect database 216 includes value ranges associated with characteristics that indicate the presence (and/or absence) of a defect in the mat 120. In an illustrative example, the defect database 216 includes a threshold size of large aggregate clusters that, when present, indicate unacceptable segregation particles of the aggregate in the mat 120. For example, if a threshold size in the defect database 216 is equal to 2 square feet, and if a size of a cluster of large aggregate particles is greater than 2 square feet on the mat 120, the comparison component 220 determines that a defect is present in the mat 120. Based at least in part on this determination, the comparison component 220 also determines that the defect corresponds to a defect type of unacceptable segregation of the large and small aggregate particles.

The mat defect ID component 214 also includes a command component 222 configured to generate commands associated with the defect and based on a determination that an identified defect is of a particular defect type. In examples, the command component 222 generates the command to identify a proposed machine activity which, when executed by the paving machine 100 (or other machine) on the paved surface, at least partially remedies the defect. For instance, the command component 222 maps the defect type to one or more commands stored in the defects database 216 known to at least partially remedy defects of the defect type. The command component 222 provides the command to mobile device 208 and/or the paving machine 100 via the network 206. In some cases, the command component 222 provides the command to the paving machine 100 such that the command causes the paving machine 100 to execute the command to remedy the defect without user intervention. For example, the command component 222 may receive an indication that the defect in the mat 120 is segregation of the aggregate, and accordingly generate a command that causes the paving machine 100 to adjust a height of the auger assembly 114 automatically and without user intervention to remedy the aggregate segregation. The paving machine 100, in such examples, is a semi-autonomous or fully autonomous machine configured to navigate the environment and/or execute paving tasks without input from a human operator.

In some examples, the mat defect ID component 214 further includes one or more machine-learned models 224 that are configured to perform tasks related to defect identification in images, defect type identification, command determination, and so forth. For instance, the feature detector 218 utilizes a machine-learned model 224 (e.g., scale-invariant feature transform (SIFT), histogram of oriented gradients (HOG), etc.) followed by a support vector machine (SVM) to classify objects depicted in images received from the camera 210 and/or the camera 134. Alternatively or additionally, the feature detector 218 may utilize a machine-learned model 224 that utilizes a deep learning approach based on a convolutional neural network (CNN) to classify objects depicted in images received from the camera 210 and/or the camera 134. For example, the feature detector 218 inputs at least a portion of an image received from the camera 210 and/or the camera 134 into a machine-learned model 224 trained to identify paving defects in images, such as one of the machine-learned models just described. The feature detector 218 receives a location of the defect in the image, and provides the location of the defect in the image to the comparison component 220, which uses the location of the defect in the image to determine a defect type of the defect.

Alternatively or additionally, the command component 222 utilizes a machine-learned model 224 to determine a command to provide to an electronic device to remedy the defect. For example, the command component 222 may utilize a machine-learned model 224 such as a regression algorithm (e.g., ordinary least squares regression (OLSR), linear regression, logistic regression, stepwise regression, multivariate adaptive regression splines (MARS), locally estimated scatterplot smoothing (LOESS)), a decision tree algorithm (e.g., classification and regression tree (CART), iterative dichotomiser 3 (ID3), Chi-squared automatic interaction detection (CHAID), decision stump, conditional decision trees), or other machine-learning algorithm to determine which remedies apply to which defects, an order of how to apply different remedies to resolve a defect, which remedies to apply in combination to resolve a defect, and so forth.

The machine-learned models 224 available to the mat defect ID component should not be limited to those just described. For instance, the machine-learned models 224 may be part of a neural network, which is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. Beyond those just described, machine learning algorithms can include, but are not limited to, instance-based algorithms (e.g., ridge regression, least absolute shrinkage and selection operator (LASSO), elastic net, least-angle regression (LARS)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

While generally described above in relation to a single instance of sensor data received from the sensors of the paving machine 100 or the mobile device 208, examples are considered in which the mat defect ID component 214 utilizes multiple instances of sensor data to identify a mat defect and/or to generate a command to remedy a mat defect. For example, the mat defect ID component 214 may receive sensor data from different types of sensors. In an illustrative example, the mat defect ID component 214 may receive image data from the camera 134 that is indicative of the mat 120, as well as receive temperature data from one or more of the temperature sensors 136, 138, 140 that is indicative of the mat 120. The mat defect ID component 214 leverages both of the sensor data types to identify the defect of the mat 120, such as by the comparison component 220 comparing values of the sensor data types to known values of corresponding sensor data types associated with different mat defects stored in the defect database 216. Additionally, in some examples, the command component 222 generates a command to provide to the electronic device to remedy the defect based on the different sensor data types. For instance, the command component 222 may generate a command that instructs the paving machine 100 to change a speed of the auger rather than changing a temperature of the screed to remedy the defect, based on a determination that the temperature sensor data associated with the screed is within an acceptable range.

Alternatively or additionally, the mat defect ID component 214 may rely on multiple instances of a same type of sensor data to identify a defect and/or to generate a command to remedy the defect. For instance, the mat defect ID component 214 may receive multiple instances of image data, such as a first image from the mobile device 208, and a second image from the camera 134 associated with the paving machine 100, and/or multiple images from different cameras mounted on the paving machine 100, to name a few examples. In some cases, first image data is generated by a first image capture device and second image data is generated by a second image capture device substantially simultaneously with the first image data. In other words, multiple instances of sensor data, such as images, are captured substantially simultaneously, but have a different perspective of the mat 120. The mat defect ID component 214 uses additional perspectives of the mat 120 to identify mat defects that may not be present in one single image of the mat, and/or to refine locations of features identified by the feature detector 218, for instance. As such, the feature detector 218 identifies features in additional images and locations of the features within the additional images. The comparison component 220 compares suspected defects at the locations of the identified features in the multiple images, and can increase confidence in a determined defect type of the defect based on having multiple images of the defect from different perspectives.

In some examples, the mat defect ID component 214 solicits user input in determining a defect type of a suspected mat defect, such as via the interactive mat defect component 212. For instance, the mat defect ID component 214 determines that a value associated with the defect is within a value range of two (or more) different defect types. The mat defect ID component 214 generates a notification comprising a first image from the defect database 216 corresponding to the first defect type, a second image from the defect database 216 corresponding to the second defect type, and so on based on the number of defect types that the value falls into the respective value ranges. Additionally, the notification includes a request for a user, such as a crew member at the worksite of the paving machine 100, to select which image is more similar to the defect currently being encountered at the paving machine 100. The mat defect ID component 214 provides the notification via the network 206 to the interactive mat defect component 212 of the mobile device 208, which in turn displays the notification including the images and the request to the user. The interactive mat defect component 212 enables the user to select which image is more similar to the defect being encountered at the paving machine 100, such as by a touch input on one of the images in a user interface of the mobile device 208. The interactive mat defect component 212 provides the selection received from the user to the mat defect ID component 214 via the network 206. Upon receiving the selection of the image associated with one of the defect types, the command component 222 generates the command based on the selection of the defect type. The mat defect ID component 214 stores the selection of the particular defect type with the original image or sensor data in the defect database 216, which may be used for subsequent mat defect identifications, to train the machine-learned models 224, to generate subsequent notifications as just described, and the like.

Furthermore, in some cases, the mat defect ID component 214 stores sensor data received from the sensors of the paving machine 100 and/or the mobile device 208 in association with identified mat defects and known defect types in the defects database 216. In this way, the defects database 216 grows to accommodate sensor data received in different conditions, at different times of day, using different paving materials, and so forth, and thus the mat defect ID component 214 becomes more accurate at identifying mat defects and generating appropriate commands to remedy the mat defects. For example, the mat defect ID component 214 determines that a first defect indicated in first image data is of a particular defect type. The mat defect ID component 214 then uses that first image in subsequent comparisons of images of suspected mat defects later in time. For instance, the mat defect ID component 214 determines that a second image is indicative of a defect of the particular defect type based on a similarity of the second defect as indicated by the first image to the first defect as indicated by the first image.

Figure 3:
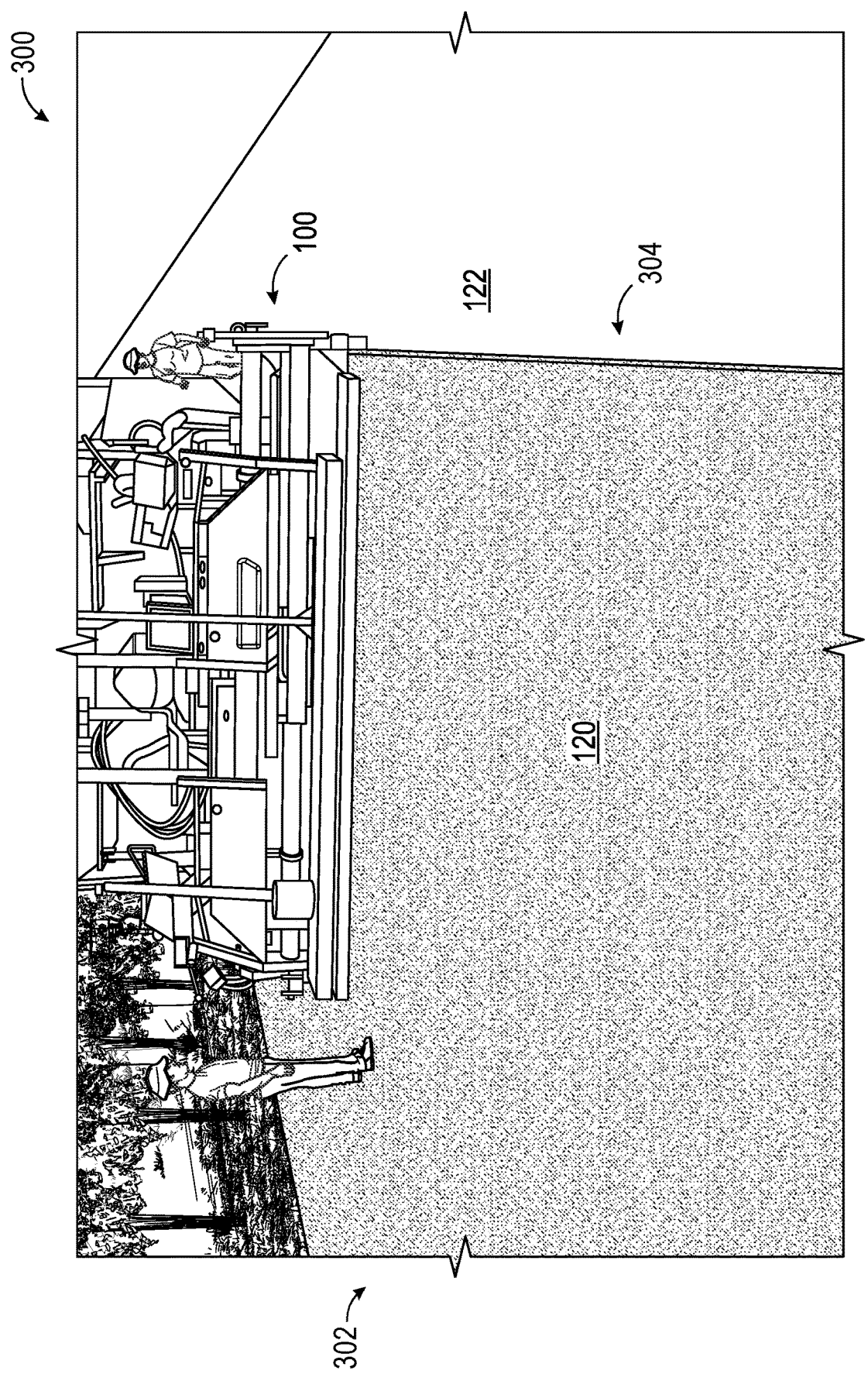
FIG. 3 is a schematic illustration of a paving machine depositing paving material on a paving surface, where the mat is free from defects, in accordance with an example of the present disclosure.

FIG. 3 is a schematic illustration 300 of the paving machine 100 depositing paving material 110 on the paving surface 122. In the schematic illustration 300, the mat 120 is free from defects, as represented by a generally uniform appearance of the mat 120. In particular, the mat 120 comprises a uniform texture from a left side 302 of the mat 120 to a right side 304 of the mat 120, with no blemishes or texture differences. In some examples, the mat defect ID component 214 stores sensor data corresponding to a mat 120 that is free from defects in the defect database 216, such as image data, temperature data, infrared data, and the like. The comparison component 220 compares sensor data corresponding to the mat 120 that is known to be free from defects stored in the defect database 216 to sensor data received from sensors of the paving machine 100 and/or the mobile device 208 to determine if subsequently-laid mats are free from defects as well. For example, the mat defect ID component 214 compares a size of a crack in the mat 120 represented in image data to a threshold size (e.g., 2 inches, 6 inches, 12 inches, etc.). If the crack is smaller than the threshold size, the mat defect ID component 214 determines that at least that portion of the mat 120 is free from defects. If the mat defect ID component 214 concludes that the mat 120 is free from defects, the mat defect ID component 214 prevents a command from being generated, and/or prevents a command from being provided to an electronic device as otherwise described herein.

Figure 4:
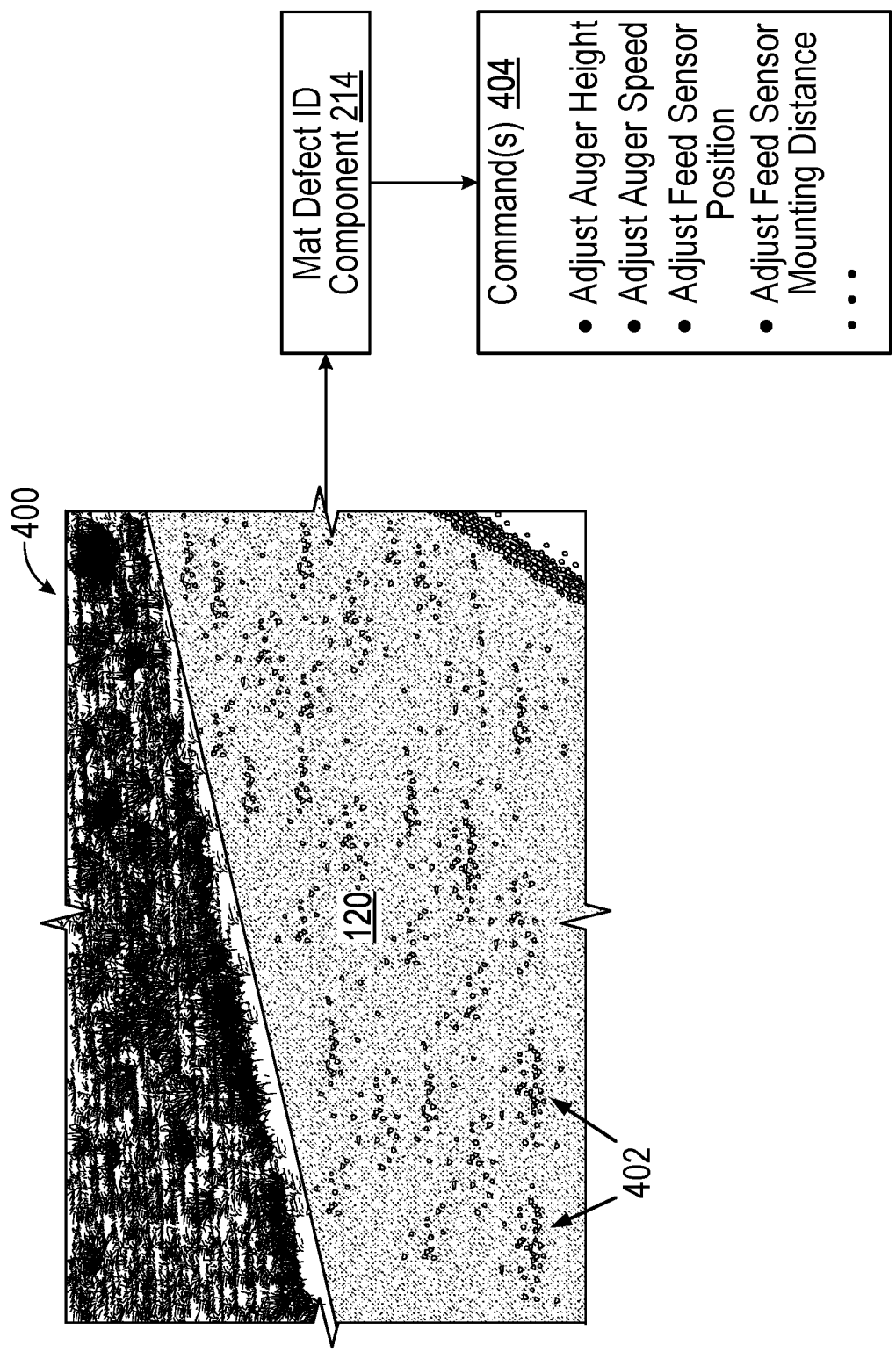
FIG. 4 is a schematic illustration of an image of a mat on a paving surface with a defect, and commands that may be provided by a control system based on the defect, in accordance with an example of the present disclosure.

FIG. 4 is a schematic illustration of an image 400 indicating a mat 120 with a defect 402. In this example, the defect 402 corresponds to segregation of large and small aggregates (e.g., rock) in the paving material 110. As noted above, segregation may result from a variety of causes, such as a position of a feed sensor, auger height, auger speed (e.g., revolutions per minute (RPM)), conveyor speed, augers reversing, and/or location or orientation of deflector plates, among others.

Figure 5:
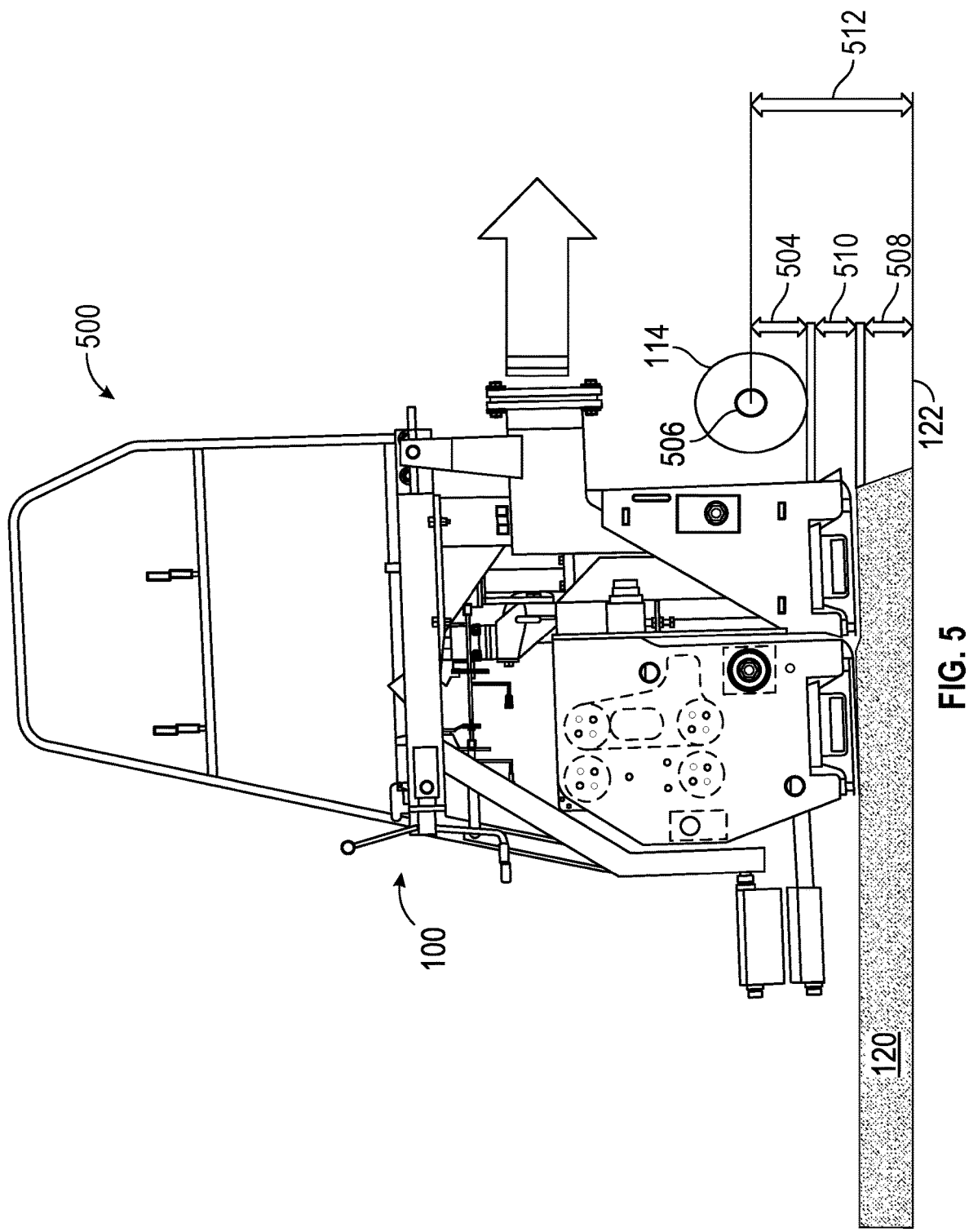
FIG. 5 is a schematic illustration of a paving machine and associated components of the paving machine depositing paving material on a paving surface, and dimensions that may be altered to adjust how the paving material is deposited on the paving surface, in accordance with an example of the present disclosure.

In the example illustrated in FIG. 4, the mat defect ID component 214 receives the image 400 (and/or other sensor data corresponding to the mat 120, as described above), and uses the feature detector 218 to detect, for instance, blobs corresponding to locations of the defect 402 in the image 400. The comparison component 220 compares a value associated with a characteristic the defect 402 to known defects in the defects database 216 to identify that the defect 402 corresponds to segregation of the aggregate. The command component 222 generates one or more commands 404 that, when executed by the paving machine 100, at least partially remedies the defect 402. In this case, the commands 404 include adjusting the auger height, adjusting the auger speed, adjusting a position of the feed sensor, adjusting the mounting distance of the feed sensor, and so forth. Two or more of the commands 404 are provided by the mat defect ID component 214 to the paving machine 100 and/or the interactive mat defect component 212 together if more than one command should be executed in association with the paving machine 100 to remedy the defect 402. Alternatively or additionally, two or more of the commands 404 are provided by the mat defect ID component 214 to the paving machine 100 and/or the interactive mat defect component 212 in series, responsive to a determination that a first command did not remedy the defect. FIGS. 5 and 6 illustrate examples of components of the paving machine 100 that may be altered to remedy a defect in accordance with the commands 404.

FIG. 5 is a schematic illustration 500 of the paving machine 100 of FIG. 1 and associated components of the paving machine 100 depositing paving material on a paving surface 122. Generally, different mixes of paving material 110 react differently to adjustment of a height of the auger assembly 114. Therefore, the auger height may need to be adjusted up or down based on mix type of the paving material 110 and an appearance of the mat 120 after paving has begun.

The auger assembly 114 has a radius 504 extending from a perimeter of the auger assembly 114 to a center of an auger shaft 506 of the auger assembly 114. In some examples, the radius 504 of the auger assembly 114 is equal to approximately 8 inches. A height 508 corresponds to a height (e.g., depth) of the mat 120 before the mat 120 is compacted, and the height 508 extends from an uppermost surface of the paving surface 122 to an uppermost surface of the mat 120. In some examples, the height 508 is equal to between approximately 2 inches and approximately 4 inches. A height 510 corresponds to a distance between the uppermost surface of the mat 120 and the perimeter of the auger assembly 114 before the mat 120 is compacted. In some examples, the height 510 is equal to between approximately 2 inches and approximately 4 inches. In some examples, a height 512 of the auger assembly 114 is set to equal the sum of the radius 504, the height 508, and the height 510. Using the example dimensions just described, the height 512 would be set to between approximately 12 inches and approximately 16 inches. Other auger radii, auger heights, and/or other dimensions are also considered, and may vary based on different auger sizes, different paving materials, and so forth.

In some cases, the height 512 of the auger assembly 114 may need to be adjusted after paving starts. For example, if the height 512 of the auger assembly 114 is set lower than a prescribed ratio (e.g., 2:1) based on material type and characteristics of the auger assembly 114, segregation of the mat 120 as illustrated by the defect 402 can result. The defect 402 may be more severe when the paving material 110 comprises larger stone mix. In some examples, the command 404 instructs the paving machine 100 (and/or an operator of the paving machine 100 via the interactive mat defect component 212 of the mobile device 208) to travel at least a distance equivalent to a full length of the paving machine 100 before evaluating whether the defect 402 has resolved.

FIG. 6 is a schematic illustration 600 of a feed sensor 602 which is included on the paving machine 100 to determines a distance to the paving material 110. The feed sensor 602 may be a mechanical paddle-type, a sonic sensor, or other type of sensor. In examples, the feed sensor 602 generates a signal that indicates a distance of the feed sensor 602 from the paving material 110 at an outboard end of an auger 604, where the paving material 110 generally moves in a steady pattern. The feed sensor 602 should be positioned such that the feed sensor 602 is sensing the active pile of the paving material 110, for instance, about 18 inches (46 cm) away from a last segment of the auger 604. In some examples, if the feed sensor 602 is a paddle-type sensor, a paddle arm of the feed sensor 602 should be positioned at substantially a 45-degree angle from the paving material 110 at the 18-inch distance. If the feed sensor 602 is positioned too close (e.g., less than a threshold amount based on a composition of the paving material 110) to the auger 604, the signal generated by the feed sensor 602 will be affected by a "wave" action of the paving material 110 coming off the auger 604 and operation of the paving machine 100 will be erratic. If the feed sensor 602 is too far away (e.g., greater than a threshold amount based on a composition of the paving material 110) from the auger 604, the signal generated by the feed sensor 602 may cause the feeder system to overfill the auger chamber. Either erratic operation of the paving machine 100 or overfilling of the auger chamber can cause segregation as illustrated by the defect 402.

In an example in which the feed sensor 602 is a sonic sensor, the feed sensor 602 generates a pulse 606 of sound that travels to the paving material 110 and is reflected back to the feed sensor 602 when the feed sensor 602 is aimed perpendicular to a face of the paving material 110. The feed sensor 602 measures the time it takes for the pulse 606 to travel to the paving material 110 and back, and the controller 154 calculates the distance from the feed sensor 602 to the paving material 110 based on the measured time. In the example in which the distance between the feed sensor 602 and the paving material 110 that will prevent segregation is 18 inches (46 cm), the operational range of the feed sensor 602, when the feed sensor 602 is a sonic sensor, may range from less than 12 inches (30 cm) resulting in the controller 154 causing the feed of paving material 110 to fully shut off, to 32 inches (81 cm) resulting in the controller 154 causing the feed of paving material 110 to be fully on. The controller 154 modulates the flow of the paving material 110 according to the sensed distance between 12 inches and 32 inches. Accordingly, a default distance of 18 inches from the feed sensor 602 to the paving material 110 will result in an easy-to-control mix height at the end of the auger 604.

However, in some instances, the feed sensor 602 may become misaligned from the paving material, which causes a pulse 608 to bounce away from the feed sensor 602 rather than directly back to the feed sensor 602. When the feed sensor 602 does not sense the pulse 608 returning, the feed sensor 602 may function erratically or not at all. Consequently, the amount of the paving material 110 being delivered may have incorrect consistency, and/or may cause the mat 120 to be too thick or too thin, thus resulting in segregation represented by the defect 402. Accordingly, the commands 404 include adjusting the feed sensor position and/or adjusting the feed sensor mounting distance to resolve the issues just described that may arise associated with the feed sensor 602 and causing the segregation represented by the defect 402.

Figure 7:
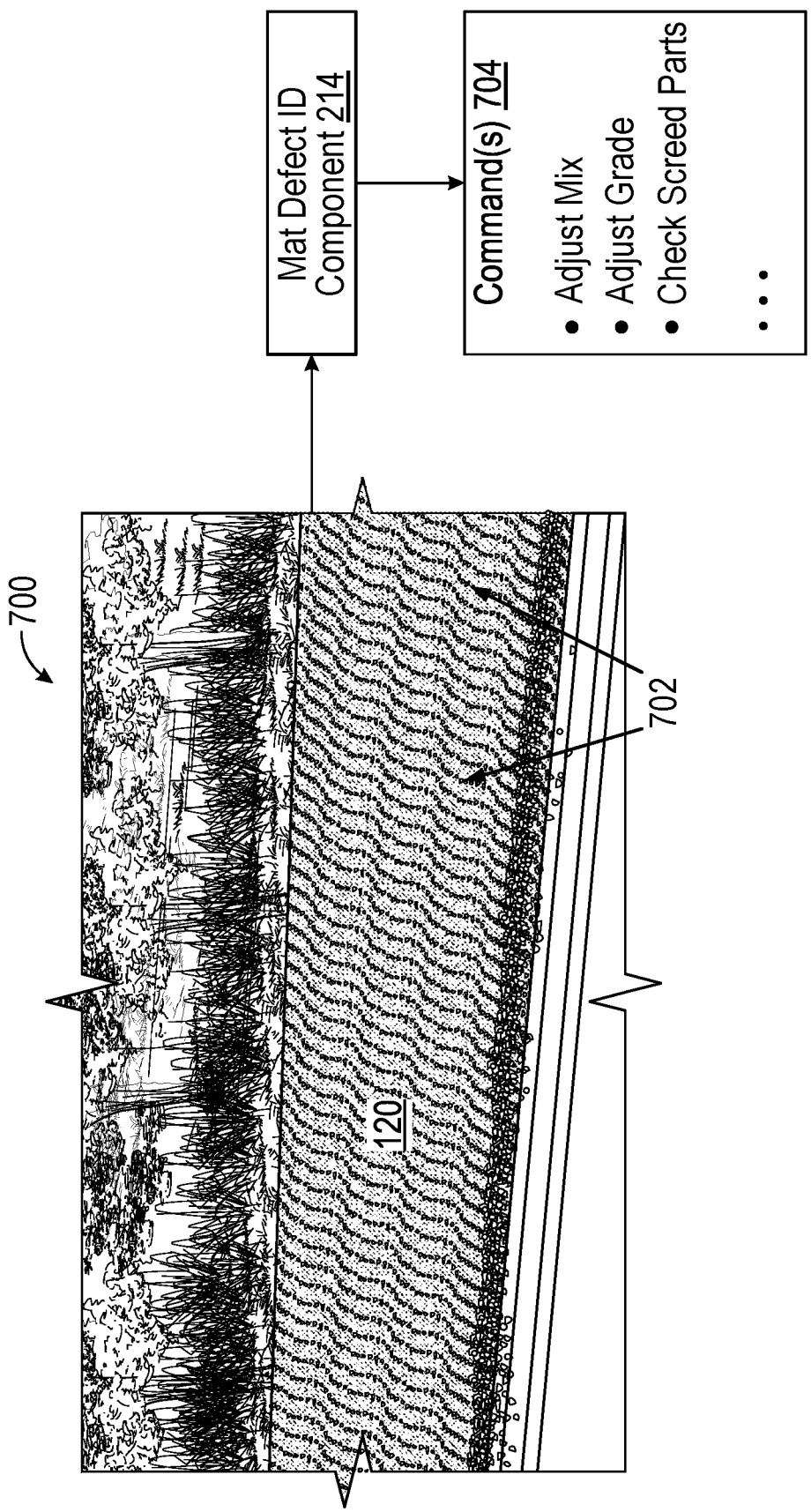
FIG. 7 is another schematic illustration of an image of a mat on a paving surface with a defect, and commands that may be provided by a control system based on the defect, in accordance with an example of the present disclosure.

FIG. 7 is another schematic illustration of an image 700 indicative of the mat 120 having a defect 702, in this case short waves/ripples in the mat 120 across a full width of the mat 120. Ripples in the mat 120 as indicated in the image 700 may result from a variety of causes, such as a screed riding at a high angle of attack, the screed riding on lift cylinders, screed plates being loose, and/or grade control improperly set, among others.

The mat defect ID component 214 receives the image 700 (and/or other sensor data corresponding to the mat 120, as described above), and uses the feature detector 218 to detect, for instance, ridges and/or edges corresponding to locations of the defect 702 in the image 700. The comparison component 220 compares a value associated with a characteristic of the defect 702 to known defects in the defects database 216 to identify that the defect 702 corresponds to ripples in the mat 120. The command component 222 generates one or more commands 704 that, when executed by the paving machine 100, at least partially remedies the defect 702. In this case, the commands 704 include adjusting the components of the mix of the paving material 110, adjusting the grade, checking parts of the screed portion 118, and so forth. Two or more of the commands 704 are provided by the mat defect ID component 214 to the paving machine 100 and/or the interactive mat defect component 212 together if more than one command should be executed in association with the paving machine 100 to remedy the defect 702. Alternatively or additionally, two or more of the commands 704 are provided by the mat defect ID component 214 to the paving machine 100 and/or the interactive mat defect component 212 in series, responsive to a determination that a first command did not remedy the defect.

Figure 8:
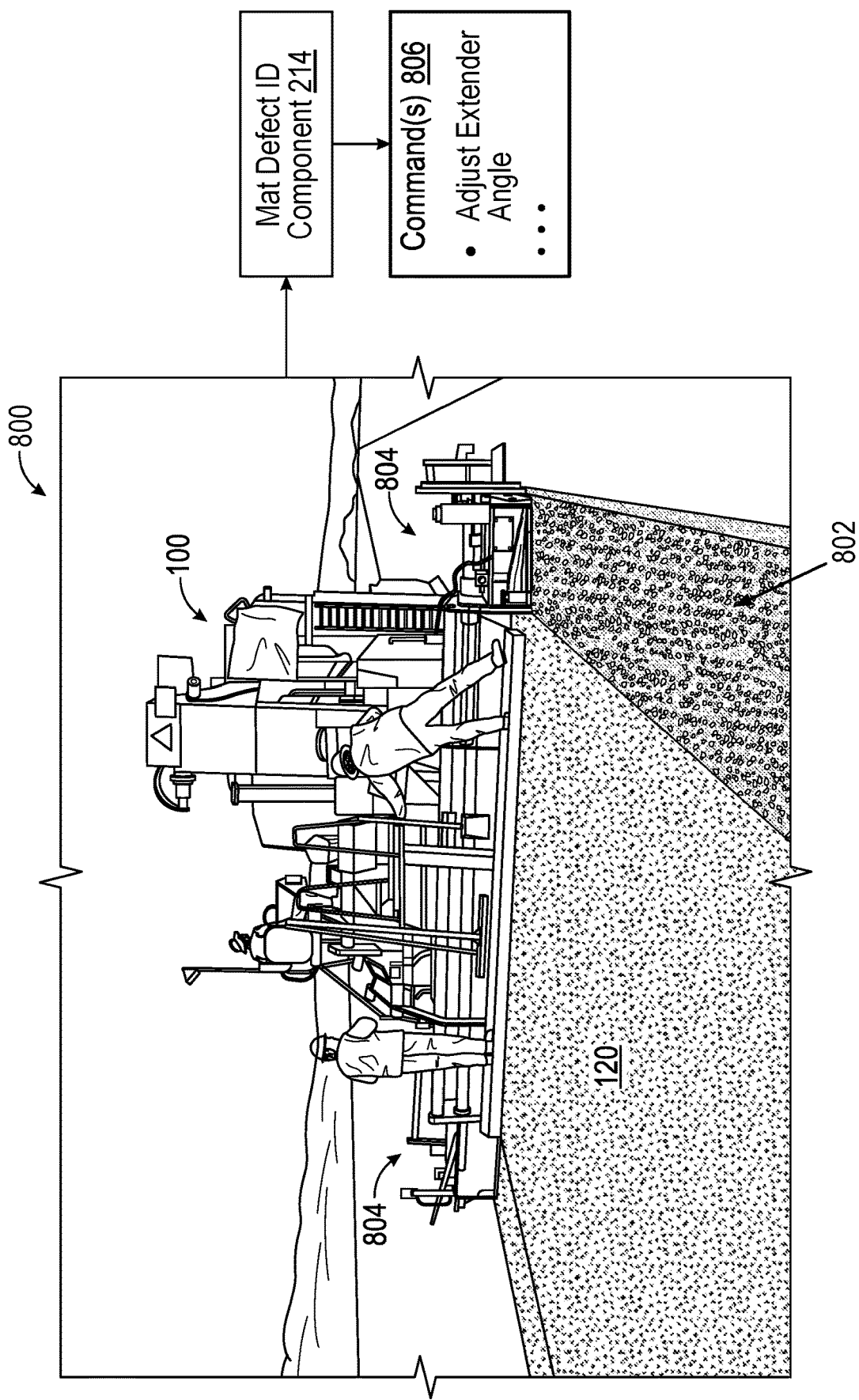
FIG. 8 is yet another schematic illustration of an image of a mat on a paving surface with a defect, and commands that may be provided by a control system based on the defect, in accordance with an example of the present disclosure.

FIG. 8 is yet another schematic illustration of an image 800 indicating the mat 120 having a defect 802. In this example, the defect 802 corresponds to a surface texture of the mat 120 being non-uniform. In some cases, non-uniform surface texture of the mat 120 as indicated in the image 800, where the non-uniformity occurs behind the extender(s) 804 of the paving machine 100, may result from the angle of attack of the extenders being too low.

The mat defect ID component 214 receives the image 800 (and/or other sensor data corresponding to the mat 120, as described above), and uses the feature detector 218 to detect, for instance, an edge corresponding to a location of the defect 802 in the image 800. The comparison component 220 compares a value associated with a characteristic of the defect 802 to known defects in the defects database 216 to identify that the defect 802 corresponds to non-uniform mat texture occurring behind the extenders. The command component 222 generates one or more commands 806 that, when executed by the paving machine 100, at least partially remedies the defect 802. In this case, the command 806 includes adjusting an angle of the extender 804, although may include other commands as well as described herein.

Figure 9:
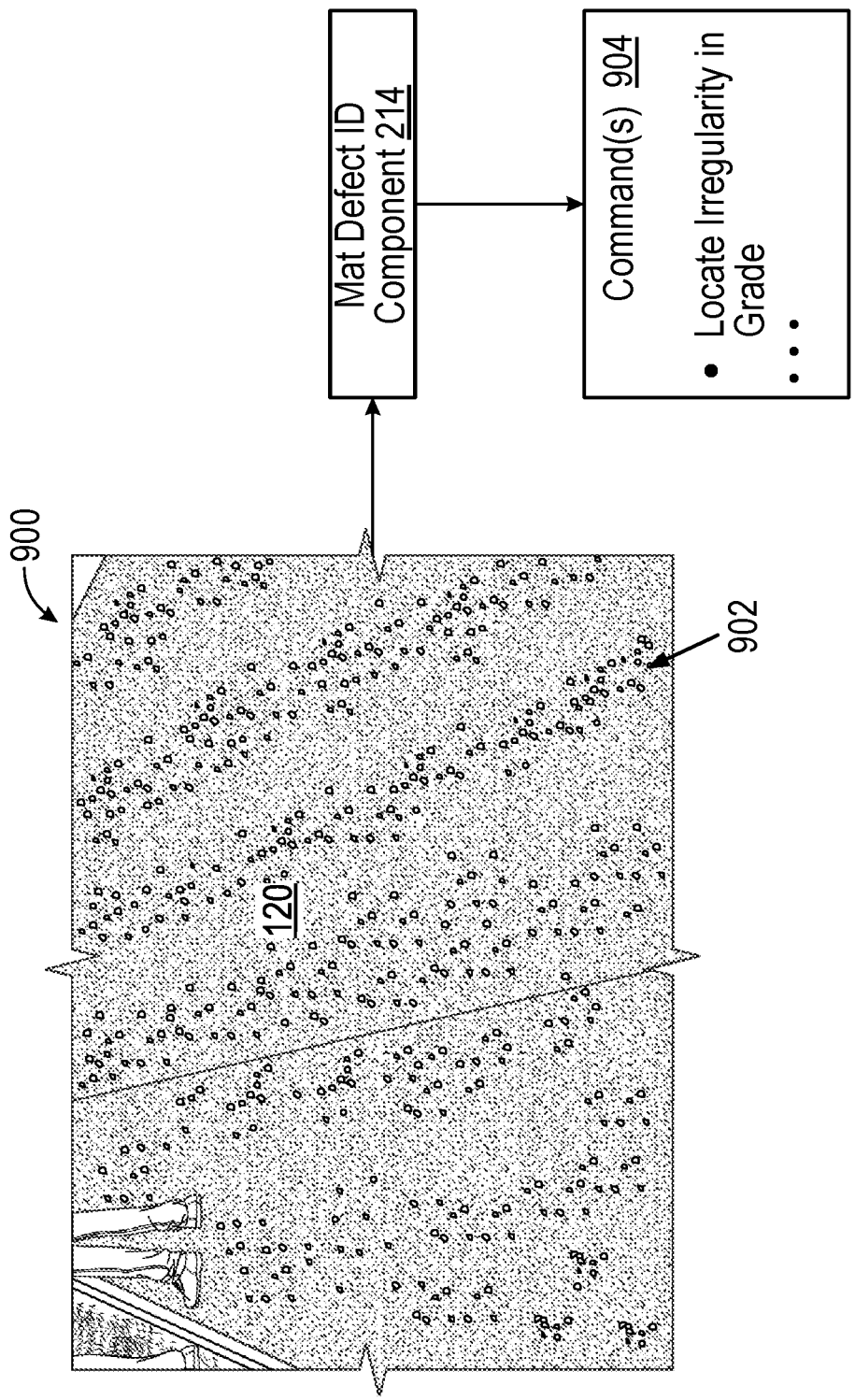
FIG. 9 is still another schematic illustration of an image of a mat on a paving surface with a defect, and commands that may be provided by a control system based on the defect, in accordance with an example of the present disclosure.

FIG. 9 is still another schematic illustration of an image 900 indicating the mat 120 on having a defect 902. In this example, the defect 902 corresponds to a "torn spot" on the surface of the mat 120. For instance, the paving machine 100 is set up with grade control on both side of the screed portion 118 using an averaging ski on each side of the screed portion 118. The averaging skis control the screed portion 118 such that the screed portion 118 fills in low spots and scalps off high spots of the paving material 110 deposited on the paving surface 122. In some cases, the paving machine 100 reaches a location at which a cold planer of the paving machine 100 left a high spot in the grade, resulting in the screed portion 118 laying a thinner mat 120 than optimal. The ratio of thickness of the mat 120 to the size of the aggregate in the paving material 110 goes below a threshold ratio, such as 2:1, resulting in the mat 120 having a torn appearance. Ideally, the high spot in the grade should be corrected before paving.

The mat defect ID component 214 receives the image 900 (and/or other sensor data corresponding to the mat 120, as described above), and uses the feature detector 218 to detect, for instance, an edge and/or a blob corresponding to locations of the defect 902 in the image 900. The comparison component 220 compares a value associated with a characteristic of the defect 902 to known defects in the defects database 216 to identify that the defect 902 corresponds to a torn mat 120. The command component 222 generates one or more commands 904 that, when executed by the paving machine 100, at least partially remedies the defect 902. In this case, the command 904 includes locating the irregularity in the grade that caused the high spot and resulting torn mat 120, although may include other commands as well as described herein.

Figure 10:
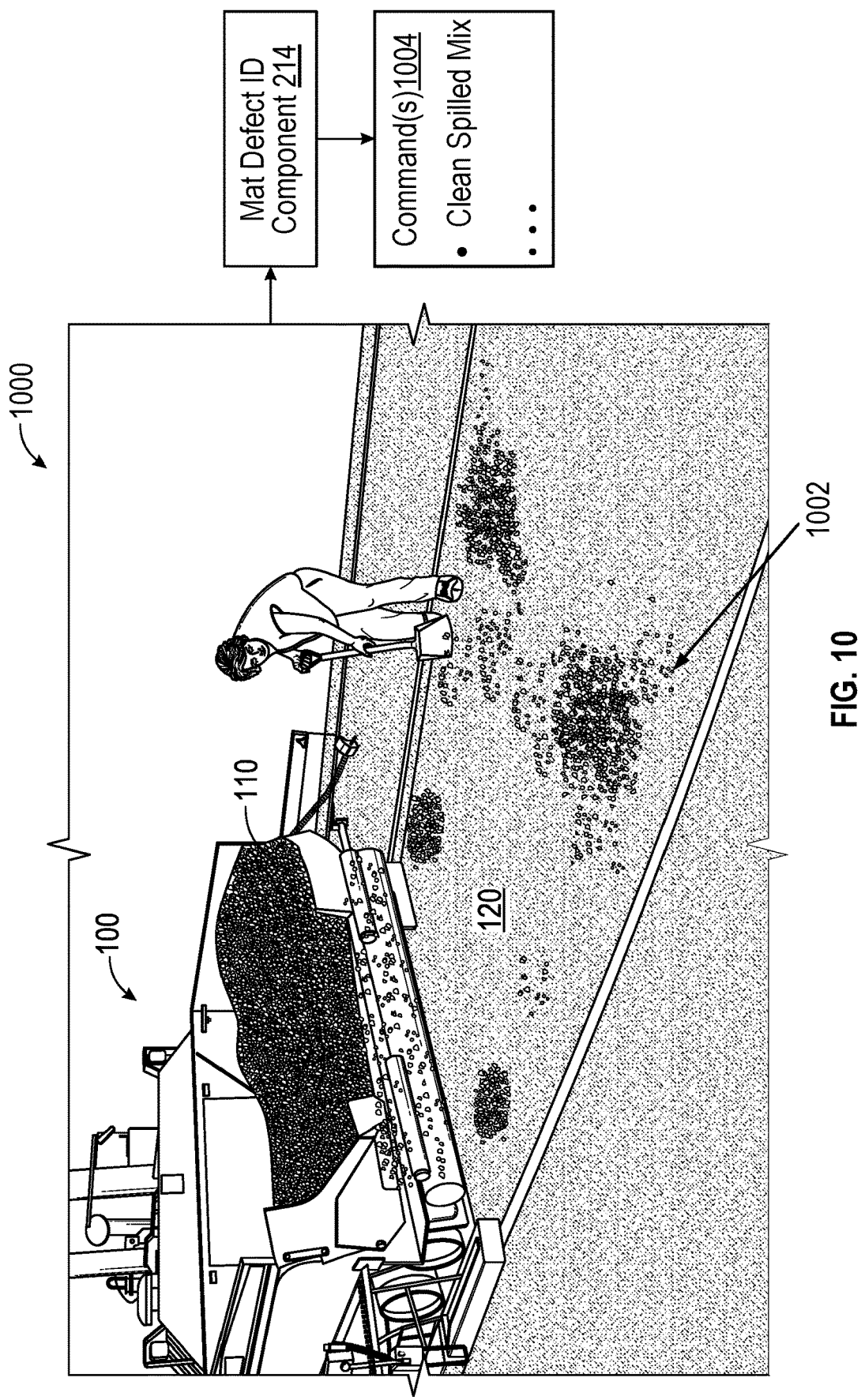
FIG. 10 is an additional schematic illustration of an image of a mat on a paving surface with a defect, and commands that may be provided by a control system based on the defect, in accordance with an example of the present disclosure.

FIG. 10 is an additional schematic illustration of an image 1000 indicating the mat 120 having a defect 1002. In this example, the defect 1002 corresponds to the paving material 110 being spilled on the mat 120. In some cases, spilling the paving material 110 on the mat 120 as indicated in the image 1000 can cause high spots that result in tearing of the mat 120 after the spreader of the paving machine 100 travels over the spills. The spilled paving material 110 should be cleaned before the spreader passes over the spilled paving material 110 to prevent high spots.

The mat defect ID component 214 receives the image 1000 (and/or other sensor data corresponding to the mat 120, as described above), and uses the feature detector 218 to detect, for instance, a blob corresponding to locations of the defect 1002 in the image 1000. The comparison component 220 compares a value associated with a characteristic of the defect 1002 to known defects in the defects database 216 to identify that the defect 1002 corresponds to paving material 110 being spilled on the mat 120. The command component 222 generates one or more commands 1004 that, when executed by the paving machine 100, at least partially remedies the defect 1002. In this case, the command 1004 includes cleaning up the spilled paving material 110, although may include other commands as well as described herein. In this case, the command 1004 may be escalated using sound, haptics, sending a notification to multiple crew members, or the like in order to promote the time-sensitive nature of cleaning the spilled paving material 110 before the spreader reaches the location of the spill.

Figure 11:
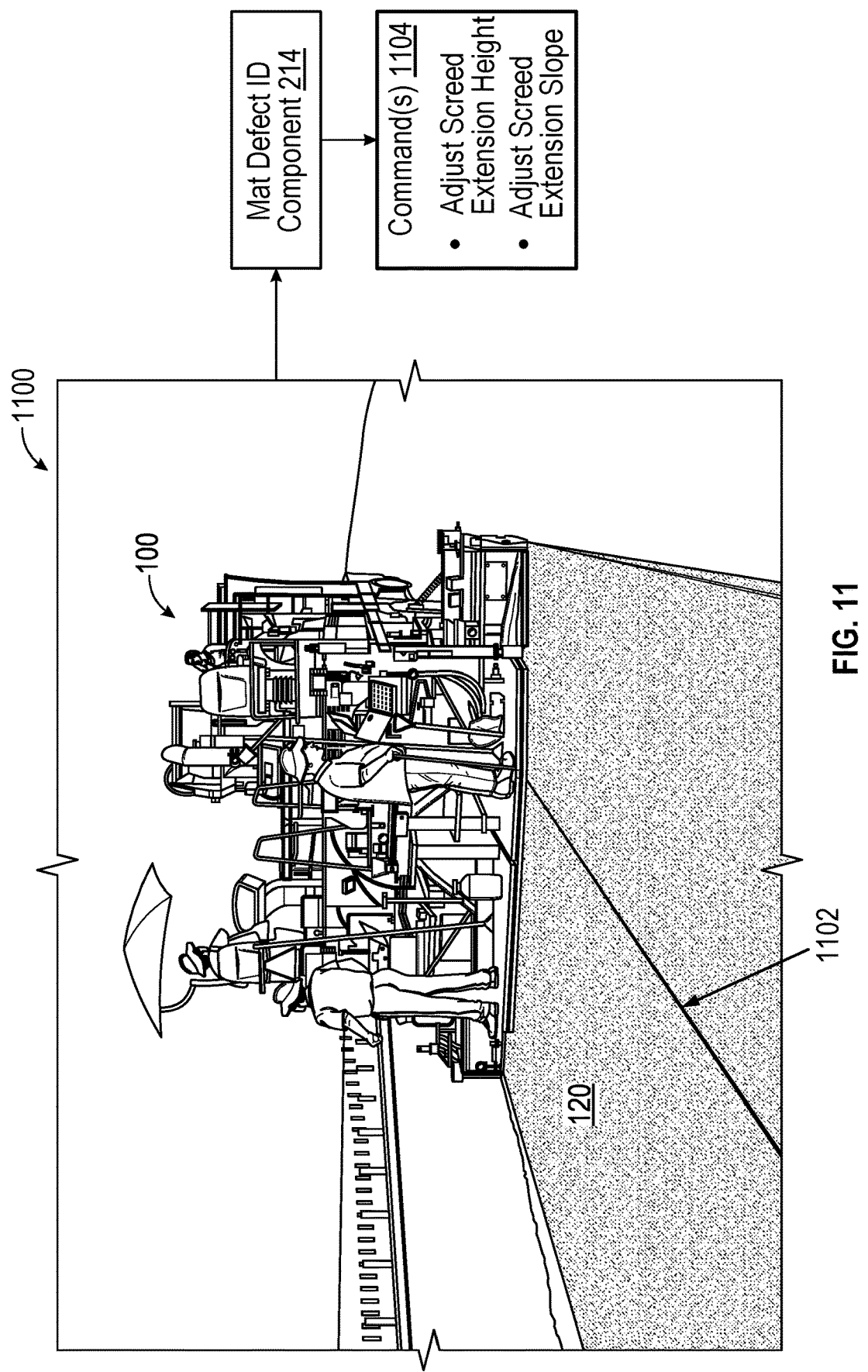
FIG. 11 is a further schematic illustration of an image of a mat on a paving surface with a defect, and commands that may be provided by a control system based on the defect, in accordance with an example of the present disclosure.

FIG. 11 is a further schematic illustration of an image 1100 indicating the mat 120 having a defect 1102. In this example, the defect 1102 corresponds to the mat 120 being torn inside of the path of the screed portion 118 of the paving machine 100. In some cases, the defect 1102 as represented in the image 1100 may result from the screed extension height being too low. Alternatively or additionally, the screed extension being too high may result in the line corresponding to the defect 1102 being in alignment with an outer edge of the main screed.

The mat defect ID component 214 receives the image 1100 (and/or other sensor data corresponding to the mat 120, as described above), and uses the feature detector 218 to detect, for instance, an edge corresponding to a location of the defect 1102 in the image 1100. The comparison component 220 compares a value associated with a characteristic of the defect 1102 to known defects in the defects database 216 to identify that the defect 1102 corresponds to the mat 120 being torn in the path of the screed portion 118. The command component 222 generates one or more commands 1104 that, when executed by the paving machine 100, at least partially remedies the defect 1102. In this case, the commands 1104 include adjusting the screed extension height, adjusting a slope of the screed extension, and so forth. In some cases, two or more of the commands 1104 are provided by the mat defect ID component 214 to the paving machine 100 and/or the interactive mat defect component 212 in series, responsive to a determination that a first command did not remedy the defect. In an illustrative example, the mat defect ID component 214 provides a first command to the interactive mat defect component 212 instructing an operator to lower the screed extension until the defect 1102 disappears from the mat 120. If the defect 1102 reappears, the mat defect ID component 214 determines that the slope of the screed extension is incorrect. Accordingly, the mat defect ID component 214 provides a second command to the interactive mat defect component 212 to use a slope extension switch to remove the defect 1102. Additionally, in some cases, the mat defect ID component 214 also provides a third command with the second command to have the operator check the position of the extension slope stop to prevent continuous problems with slope height.

Figure 12:
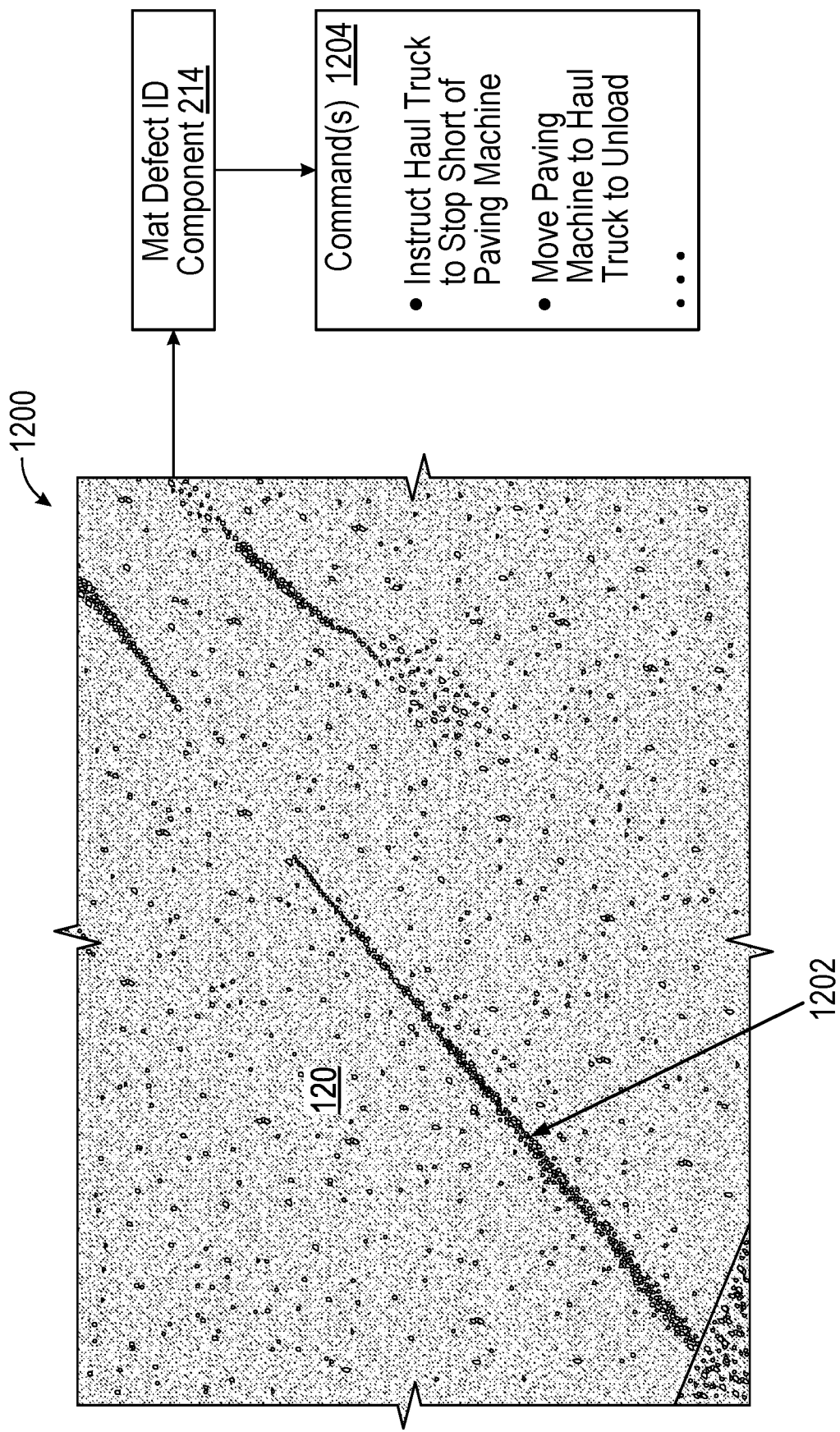
FIG. 12 is one more schematic illustration of an image of a mat on a paving surface with a defect, and commands that may be provided by a control system based on the defect, in accordance with an example of the present disclosure.

FIG. 12 is still another schematic illustration of an image 1200 indicating the mat 120 having a defect 1202. In this example, the defect 1202 corresponds to a bump caused when a haul truck bumps into the paving machine 100, causing the screed portion 118 to gouge the mat 120.

The mat defect ID component 214 receives the image 1200 (and/or other sensor data corresponding to the mat 120, as described above), and uses the feature detector 218 to detect, for instance, an edge and/or a ridge corresponding to locations of the defect 1202 in the image 1200. The comparison component 220 compares a value associated with a characteristic of the defect 1202 to known defects in the defects database 216 to identify that the defect 1202 corresponds to a gouge made by the screed portion 118 when a haul truck bumps into the paving machine 100 when depositing the paving material 110. The command component 222 generates one or more commands 1204 that, when executed by the paving machine 100, at least partially remedies the defect 1202. In this case, the commands 1204 include instructing an operator of the haul truck to stop short of the paving machine 100, instructing an operator of the paving machine 100 to move the paving machine 100 to the haul truck to unload the paving material 110, and so forth. In this case, the commands 1204 are sent to both an electronic device associated with the operator of the haul truck and an electronic device associated with the operator of the paving machine 100 substantially simultaneously to ensure that both operators know what to do to remedy the defect 1202.

Figure 13:
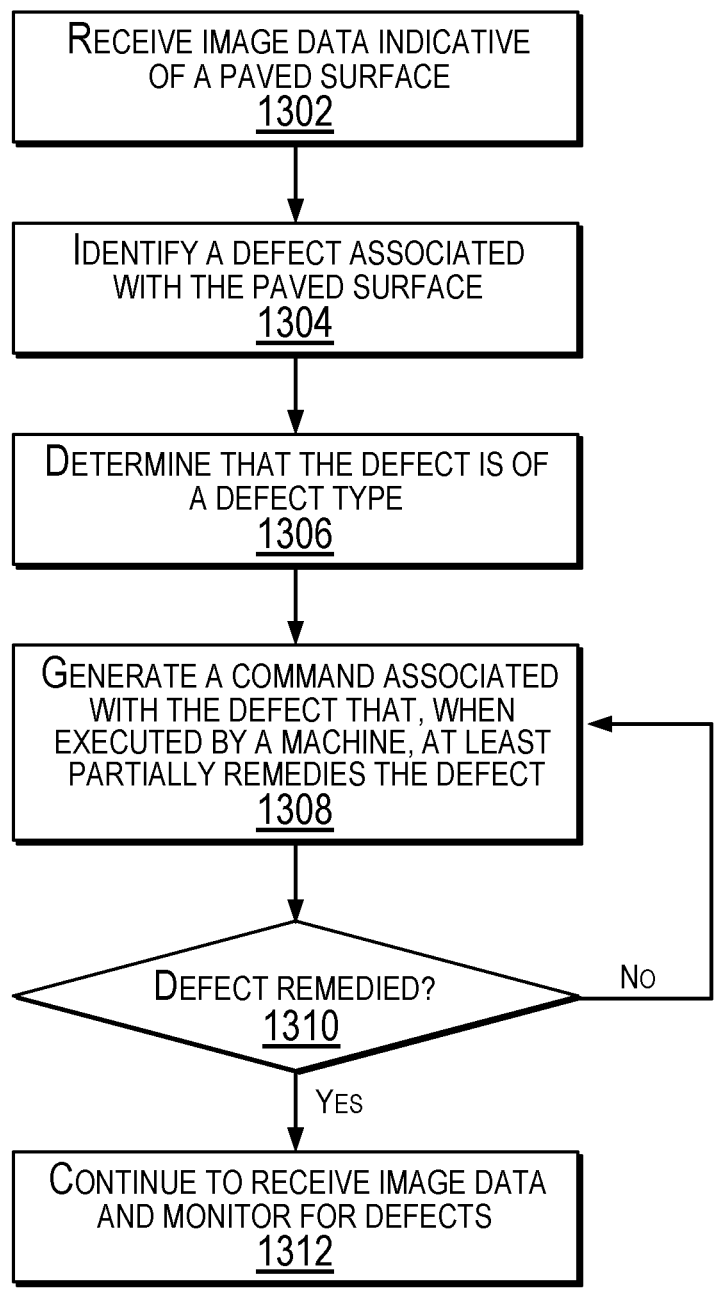
FIG. 13 is a flow chart depicting a method of generating a command to remedy an identified paving mat defect in accordance with an example of the present disclosure.

FIG. 13 is a flow chart depicting a method 1300 of generating a command to remedy an identified paving mat defect in accordance with an example of the present disclosure. The example method 1300 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 154, such instructions cause the controller 154, various components of the control system 200, and/or the paving machine 100, generally, to perform the recited operations. Such computer-executable instructions comprise routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 1300 is described with reference to the paving machine 100 of FIG. 1 and the control system 200 of FIG. 2.

At 1302, the mat defect ID component 214 receives sensor data, such as image data, indicative of a paved surface, such as from the paving machine 100 and/or the mobile device 208 via the network 206. While the method 1300 generally makes reference to image data, the controller 154 may alternatively or additionally receive other data types as well, such as video, LIDAR data, RADAR data, infrared data, and the like from the camera 134 and/or the camera 210, the LIDAR sensor 150, the RADAR sensor 152, the temperature sensors 136, 138, 140, and so on.

At 1304, the mat defect ID component 214 identifies a defect associated with the paved surface. For example, the feature detector 218 computes abstractions of the image data and makes local decisions at image points in the image data regarding whether the image point includes an image feature or not. The feature detector 218 detects features such as edges, ridges, blobs, or other feature types. Additionally, the mat defect ID component 214 uses the features identified by the feature detector 218 to locate, within an image, a location of a potential mat defect of the mat 120.

At 1306, the mat defect ID component 214 determines that the defect is of a defect type. In some examples, the comparison component 220 compares a potential mat defect in the image data to known defects in the defect database 216. In examples, the comparison component 220 determines a value associated with the detected feature in the image data and based in part on the feature detected by the feature detector 218. The comparison component 220 compares the value to known values (and/or value ranges) associated the known defects in the defect database 216. The comparison component 220 relies on one or more of a variety of characteristics of defects and their associated values to determine the presence of a mat defect from sensor data, such as size values (e.g., length, width, height, depth, and the like of the suspected defect), temperature values, distance values and/or angle values (e.g., relative to the paving machine 100 or a particular part of the paving machine 100, relative to an extent of the mat 120, and the like), and so on. In some examples, the defect database 216 includes value ranges associated with characteristics that indicate the presence (and/or absence) of a defect in the mat 120. For example, the defect database 216 includes a threshold size of 2 square feet for large aggregate consolidation in the mat 120. The comparison component 220 compares a suspected aggregate segregation defect in image data to the threshold size stored in the defect database 216 to determine whether the mat 120 includes the aggregate segregation defect.

At 1308, the mat defect ID component 214 generates a command associated with the defect that, when executed by a machine such as the paving machine 100, at least partially remedies the defect. For instance, the command component 222 maps the defect type to one or more commands stored in the defects database 216 known to at least partially remedy defects of the defect type. In some cases, the command component 222 determines multiple commands to be executed by one or more machines, either together (e.g., substantially simultaneously) or in parallel, that at least partially remedy the defect. The command component 222 determines which machines to provide the command(s) to, such as the paving machine 100, the mobile device 208, a haul truck, or another machine based on how the command is to be executed and machines mapped to commands in the defect database 216. For example, the command 1004 is provided to the mobile device 208 to instruct a crew member to clean spilled paving material 110, while the command 806 is provided directly to the paving machine 100 to adjust the extender angle automatically and without user intervention.

At 1310, the mat defect ID component 214 determines whether the defect is remedied. For example, the mat defect ID component 214 compares sensor data received subsequent to providing the command to the paving machine 100 and/or the mobile device 208 to sensor data in the defect database 216 corresponding to defect-free paving mats, and paving mats having the suspected defect, as described above. If the mat defect ID component 214 determines that the defect is remedied (e.g., "Yes" at 1310), at 1312 the mat defect ID component 214 continues to receive image data (or other sensor data) from the paving machine 100 and/or the mobile device 208 and continues to monitor for defects. If the mat defect ID component 214 determines that the defect is not remedied (e.g., "No" at 1310), the method 1300 returns to operation 1308. For example, the mat defect ID component 214 generates a different command than the original command to remedy the defect, which includes different instructions to at least partially remedy the defect. The mat defect ID component 214 provides the different command to an electronic device such as the paving machine 100 and/or the mobile device 208, similar to the discussion above.

INDUSTRIAL APPLICABILITY

The present disclosure provides systems and methods for correcting a defect associated with a mat 120 of paving material 110 formed at a worksite. Such systems and methods may be used to achieve better paving and compacting performance by remedying defects earlier and with greater accuracy. Additionally, such systems and methods may be used to improve efficiencies in remedying defects by not having to rely upon paving operators who are inexperienced with the variety of defects that may occur and how to resolve such defects. As noted above with respect to FIGS. 1-13, an example method 1300 of correcting paving mat defects may include receiving, with a controller 154, image data indicative of a paved surface 122 and identifying, with the controller 154 and based at least in part on the image data, a defect associated with the paved surface 122, the defect having a characteristic that is characterized by a value. Such an example method 1300 also includes determining, with the controller 154, that the value is within a value range corresponding to a defect type, and determining, based at least in part on the value being within the value range, that the defect is of the defect type. Such an example method 1300 further includes generating a command 404 associated with the defect and based at least in part on determining that the defect is of the defect type. In the example method 1300, the command 404 identifies a proposed machine activity which, when executed by a machine 100 on the paved surface 122, at least partially remedies the defect. Such an example method 1300 further includes providing the command 404 to an electronic device 208 via a network 206.

By comparing values associated with suspected paving mat defects determined from sensor data, such as image data, with known values for different defect types, defects can be remedied more accurately and efficiently than previous techniques. For example, the mat defect ID component 214 can provide a command 404 to an electronic device 208 associated with an operator of the paving machine 100, which instructs the operator on how to change a setting of the paving machine 100 to remedy the detected defect. Alternatively or additionally, the mat defect ID component 214 can provide a command 404 directly to the paving machine 100 to execute the command 404 to remedy the defect without user intervention, allowing the paving machine 100 to autonomously correct defects while a paving project is underway. Such information may also be used by the paving material production plant to more closely manage paving material compositions and/or to optimize the scheduling of haul truck deliveries based on a type of defect detected and an estimated time to remedy the defect. Thus, the example systems and methods described above may provide considerable cost savings, and may reduce the time and labor required for various paving activities at the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   receiving image data indicative of a paved surface;
   identifying, based at least in part on the image data, a defect caused by a machine depositing the paved surface, the defect having a characteristic that is characterized by a value;
   determining that the value is within a range of values corresponding to a defect type;
   determining, based at least in part on the value being within the range of values, that the defect corresponds to the defect type;
   determining, based at least in part on the defect corresponding to the defect type, a command associated with the machine at least partially remedying the defect; and
   sending the command to at least one of an electronic device or the machine, wherein the command, when executed, causes a change of a setting of the machine depositing the paved surface, to at least partly remedy the defect.

2. The method according to claim 1, wherein the image data is received from an imaging device associated with the at least one of the electronic device or the machine.

3. The method according to claim 1, wherein the image data comprises first image data, the method further comprising:
   receiving second image data indicative of the paved surface; and
   identifying, based at least in part on the second image data, the defect associated with the paved surface, wherein determining that the defect corresponds to the defect type is further based at least in part on identifying the defect in the second image data.

4. The method according to claim 3, wherein the first image data is generated by a first imaging device, and the second image data is generated by a second imaging device substantially simultaneously with the first image data.

5. The method according to claim 1, wherein the defect type comprises a first defect type and the range of values comprises a first range of values, the method further comprising:
determining that the value is within a second ranges of values corresponding to a second defect type;
generating a notification that includes:
a first image associated with the first defect type,
a second image associated with the second defect type, and
a request for a user to select whether the defect corresponds to the first defect type or the second defect type;
sending the notification to the electronic device; and
receiving an indication from the electronic device, the indication being indicative of the defect corresponding to the first defect type,
wherein the command is determined based at least in part on the indication.

6. The method according to claim 1, wherein the image data comprises first image data and the defect comprises a first defect, the method further comprising:
determining, based at least in part on second image data, a threshold size of a second defect known to be of the defect type indicated in the second image data,
wherein determining that the first defect is of the defect type is further based at least in part on a size of the first defect satisfying the threshold size.

7. A machine, comprising:
a sensor;
one or more processors; and
one or more non-transitory computer-readable media storing instructions that, when executed by the one or more processors, cause the one or more processors to perform operations comprising:
receiving, from the sensor, sensor data indicative of a paved surface at which the machine operates;
identifying, based at least in part on the sensor data, a defect caused by a machine depositing the paved surface;
determining a value characterizing the defect;
determining that the value is within a range of values corresponding to a type of defect present on the paved surface;
determining, based at least in part on the value being within the range of values, that the defect corresponds to the type of defect;
determining a setting of the machine depositing the paved surface; and
operating the machine depositing the paved surface in accordance with the setting, wherein operating the machine depositing the paved surface in accordance with the setting causes the defect to be at least partly remedied.

8. The machine according to claim 7, wherein the sensor data comprises first sensor data and the setting comprises a first setting, the operations further comprising:
receiving, from the sensor, second sensor data indicative of the paved surface; and
identifying, based at least in part on the second sensor data, an absence of the defect associated with the paved surface.

9. The machine according to claim 7, wherein the sensor comprises a first sensor, the sensor data comprises first sensor data, the defect comprises a first defect, and the machine further comprises a second sensor, the operations further comprising:
receiving, from the second sensor, second sensor data indicative of the paved surface;
identifying, based at least in part on the second sensor data, a second defect associated with the paved surface;
determining that the first defect and the second defect are a same type of defect,
wherein determining the defect is further based at least in part on determining that the first defect and the second defect are the same type of defect.

10. The machine according to claim 7, wherein the sensor data comprises image data, and identifying the defect associated with the paved surface comprises:
inputting at least a portion of the image data into a machine-learned model trained to identify defects associated with paved surfaces; and
receiving, from the machine-learned model, a location of the defect within the image data,
wherein the defect is identified based at least in part on the location of the defect in the image data.

11. The machine according to claim 7, wherein determining the setting comprises:
inputting the type of defect into a machine-learned model trained to determine remedies for defects within paved surfaces; and
receiving, from the machine-learned model, a remedy for the defect,
wherein the setting is based at least in part on the remedy.

12. The machine according to claim 7, the operations further comprising:
causing output of a notification associated with the defect; and
receiving a response indicating that the defect corresponds to the type of defect,
wherein determining that the defect corresponds to the type of defect is further based at least in part on the response.

13. A method, comprising:
receiving sensor data indicative of a paved surface at a worksite;
identifying, based at least in part on the sensor data, a feature associated with the paved surface;
identifying, based at least in part on the feature, a defect within the paved surface caused by a machine depositing the paved surface;
determining a type of defect associated with the defect;
determining, based at least in part on the type of defect, an action comprising a setting associated with the machine at least partially remedying the defect;
causing output of an indication associated with at least one of the defect, the type of defect, or the action; and
causing the action to be performed at least in part by the machine.

14. The method according to claim 13, wherein the indication comprises a first indication, the method further comprising:
causing an output of a second indication associated with the defect; and
receiving a third indication associated with a confirmation of the defect, wherein the type of defect is determined based at least in part on the third indication.

15. The method according to claim 13, wherein the sensor data comprises first sensor data and the defect comprises a first defect, the method further comprising:
receiving second sensor data indicative of the paved surface at the worksite;
identifying, based at least in part on the second sensor data, a second defect within the paved surface;
determining that the first defect and the second defect represent a similar type of defect within the paved surface, and
wherein determining the action is further based at least in part on the first defect and the second defect representing the similar type of defect.

16. The method according to claim 13, further comprising:
inputting the sensor data into a machine-learned model;
receiving, as output from the machine-learned model, a score representing a likelihood that the defect is present within the paved surface; and
determining that the score satisfies a threshold score,
wherein identifying the defect within the paved surface is further based at least in part on the score satisfying the threshold score.

17. The method according to claim 13, wherein the indication comprises a first indication, the method further comprising:
sending at least a portion of the sensor data to a computing resource;
receiving a second indication from the computing resource, the second indication indicating at least one of:
the defect,
the type of defect, or
the action,
wherein causing the action to be performed is based at least in part on the second indication.

18. The method according to claim 13, wherein the sensor data comprises first sensor data, the method further comprising:
identifying second sensor data associated with the type of defect;
determining, based at least in part on the second sensor data, a range of values associated with the type of defect;
determining a value associated with the feature; and
determining that the value is within the range of values,
wherein determining the type of defect associated with the defect is based at least in part on the value being within the range of values.

19. The method according to claim 18, wherein the value corresponds to a size of the defect, a temperature of the paved surface, or a location of the defect on the paving surface.

20. The method according to claim 13, wherein:
the action is associated with a setting of the machine depositing the paved surface; and
causing the action to be performed comprises causing the machine to implement the setting, the setting at least partially remedying the defect.

* * * * *